(12) United States Patent
Andersson et al.

(10) Patent No.: US 10,623,740 B2
(45) Date of Patent: Apr. 14, 2020

(54) DETERMINATION OF QP VALUES

(71) Applicant: TELEFONAKTIEBOLAGET LM ERICSSON (PUBL), Stockholm (SE)

(72) Inventors: Kenneth Andersson, Gävle (SE); Per Hermansson, Årsta (SE); Martin Pettersson, Vallentuna (SE); Jonatan Samuelsson, Enskede (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 39 days.

(21) Appl. No.: 15/762,393

(22) PCT Filed: Jul. 7, 2016

(86) PCT No.: PCT/SE2016/050699
§ 371 (c)(1),
(2) Date: Mar. 22, 2018

(87) PCT Pub. No.: WO2017/052440
PCT Pub. Date: Mar. 30, 2017

(65) Prior Publication Data
US 2018/0278934 A1    Sep. 27, 2018

Related U.S. Application Data

(60) Provisional application No. 62/222,399, filed on Sep. 23, 2015.

(51) Int. Cl.
*H04N 19/124* (2014.01)
*H04N 19/186* (2014.01)
(Continued)

(52) U.S. Cl.
CPC ............. *H04N 19/124* (2014.11); *H04N 1/64* (2013.01); *H04N 19/126* (2014.11);
(Continued)

(58) Field of Classification Search
CPC .. H04N 19/124; H04N 19/126; H04N 19/134; H04N 19/50; H04N 1/64; H04N 19/196; H04N 19/186
See application file for complete search history.

(56) References Cited

U.S. PATENT DOCUMENTS 10,148,959 B2    12/2018    Sato
2013/0188693 A1*    7/2013    Xu .......................... H04N 19/70
375/240.03

FOREIGN PATENT DOCUMENTS

WO    2015/137145 A1    9/2015
WO    2015/138962 A1    9/2015

OTHER PUBLICATIONS

Extended European Search Report dated Apr. 25, 2019 issued in European Patent Application No. 16849099.3. (11 pages).
(Continued)

*Primary Examiner* — Nam D Pham
(74) *Attorney, Agent, or Firm* — Rothwell, Figg, Ernst & Manbeck, P.C.

(57) ABSTRACT

A QP offset value is calculated for a chroma component of a pixel in a picture of a video sequence based on a reference QP value and a factor that depends on a difference between a capture color space for the pixel and an encoded color space for the pixel. A QP value is then calculated for the chroma component based on the reference QP value reduced by the QP offset value. The calculation of QP values for chroma components based on the factor that depends on the difference between capture and encoded color spaces improves the chroma quality in an efficient way in particular for HDR and WCG video.

25 Claims, 9 Drawing Sheets

(51) Int. Cl.
    *H04N 1/64*         (2006.01)
    *H04N 19/50*       (2014.01)
    *H04N 19/134*     (2014.01)
    *H04N 19/126*     (2014.01)
    *H04N 19/196*     (2014.01)

(52) U.S. Cl.
    CPC ......... *H04N 19/134* (2014.11); *H04N 19/186* (2014.11); *H04N 19/196* (2014.11); *H04N 19/50* (2014.11)

(56) References Cited

OTHER PUBLICATIONS

Zhang, L. et al., "Adaptive Color-space Transform for HEVC Screen Content Coding", 2015 Data Compression Conference, IEEE, (2015). (10 pages).

Chono, K. et al., "Enhanced QP offset signalling for adaptive cross-component transform in SCC extensions", Joint Collaborative Team on Video Coding (JCT-VC) of ITU-T SG 16 WP 3 and ISO/IEC JTC 1/SC 29/WG 11, Document: JCTVC-T0140-r3, 20th Meeting: Geneva, CH, (Feb. 2015). (8 pages).

Rapaka, K. et al., "Qp derivation and offsets signaling for adaptive color transform", Joint Collaborative Team on Video Coding (JCT-VC) of ITU-T SG 16 WP 3 and ISO/IEC JTC 1/SC 29/WG 11, Document: JCTVC-50300, 19th Meeting: Strasbourg, FR, (Oct. 2014). (5 pages).

International Search Report and Written Opinion dated Nov. 16, 2016 issued in International Patent Application PCT/SE2016/050699 (20 pages).

Andersson, K. et al., "Report for CE1.a (Chroma QP)" 113. MPEG meeting; Oct. 19, 2015-Oct. 23, 2015; Geneva; (Motion Picture Expert Group or ISO/IEC JTC1/SC29/WG11), Oct. 13, 2015, NR m37179 (6 pages).

Telefon AB-LM Ericsson, "Chroma QP Offset Model", ITU-TSG16 meeting; Oct. 12, 2015-Oct. 23, 2015; Geneva, Sep. 29, 2015 NR T13-SG16-C-1029 (6 pages).

International Telecommunication Union, CH "Series H: Audiovisual and Multimedia Systems Infrastructure of audiovisual services—Coding of moving video High efficiency video coding" Series H: Audiovisual and Multimedia Systems, Apr. 1, 2015 vol. ITU-T H.265 https://www.itu.int/rec/dologin_pub.asp?lang=e&id=T-REC-H.265-201504-I!!Pdf-E&type=items (634 pages).

Samuelsson, J. et al., "Using Chroma QP Offset on HDR Sequences", 112. MPEG meeting; Jun. 22, 2015-Jun. 26, 2015; Warsaw; (Motion Picture Expert Group or ISO/IEC JTC1/SC29/WG11), Jun. 23, 2015, NR m36581 (5 pages).

Tourapis, A. et al., "Use of Chroma QP Offsets on HDR/WCG Sequences", 112. MPEG meeting; Jun. 22, 2015-Jun. 26, 2015; Warsaw; (Motion Picture Expert Group or ISO/IEC JTC1/SC29/WG11), Jun. 22, 2015, NR m36749 (4 pages).

Van Der Auwera, G. et al., "AHG6: Chroma QP Offset and Deblocking" 10. JCT-VC meeting; 101. MPEG meeting; Jul. 11, 2012-Jul. 20, 2012; Stockholm; (Joint Collaborative Team on Video Coding of ISO/IEC JTC1/SC29/WG11 and ITU-T SG.16); http:wftp3.itu.int/av-arch/jctvc-site/, Jul. 3, 2012, NR JCTVC-J0091 (5 pages).

SMPTE, "High Dynamic Range Electro-Optical Transfer Function of Mastering Reference Displays", SMPTE Standard. SMPTE ST 2084:2014, Aug. 16, 2014 (14 pages).

International Telecommunication Union, CH "Series H: Audiovisual and Multimedia Systems: Infrastructure of audiovisual services—Coding of moving video High efficiency video" Series H: Audiovisual and Multimedia Systems, (Oct. 2014) vol. ITU-T H.265 (540 pages).

Notice of Reasons for Rejection dated Jul. 2, 2019 issued in Japanese Patent Application No. 2018-515017. (4 pages).

Chono, K. et al., "Enhanced chroma QP signalling for adaptive cross-component transform in SCC extensions", Joint Collaborative Team on Video Coding (JCT-VC) of ITU-T SG 16 WP 3 and ISO/IEC JTC 1/SC 29/WG 11; 19th Meeting: Strasbourg, FR, Oct. 17-24, 2014; Document: JCTVC-50040-v2; (Oct. 2014). (7 pages).

Rapaka, K. et al., "QP derivation for adaptive color transform", Joint Collaborative Team on Video Coding (JCT-VC) of ITU-T SG 16 WP 3 and ISO/IEC JTC 1/SC 29/WG 11; 19th Meeting: Strasbourg, FR, Oct. 17-24, 2014; Document: JCTVC-S0144; (Oct. 2014). (6 pages).

"High Efficiency Video Coding," Recommendation ITU-T H.265, Oct. 2014, pp. 159-160 (3 pages).

\* cited by examiner

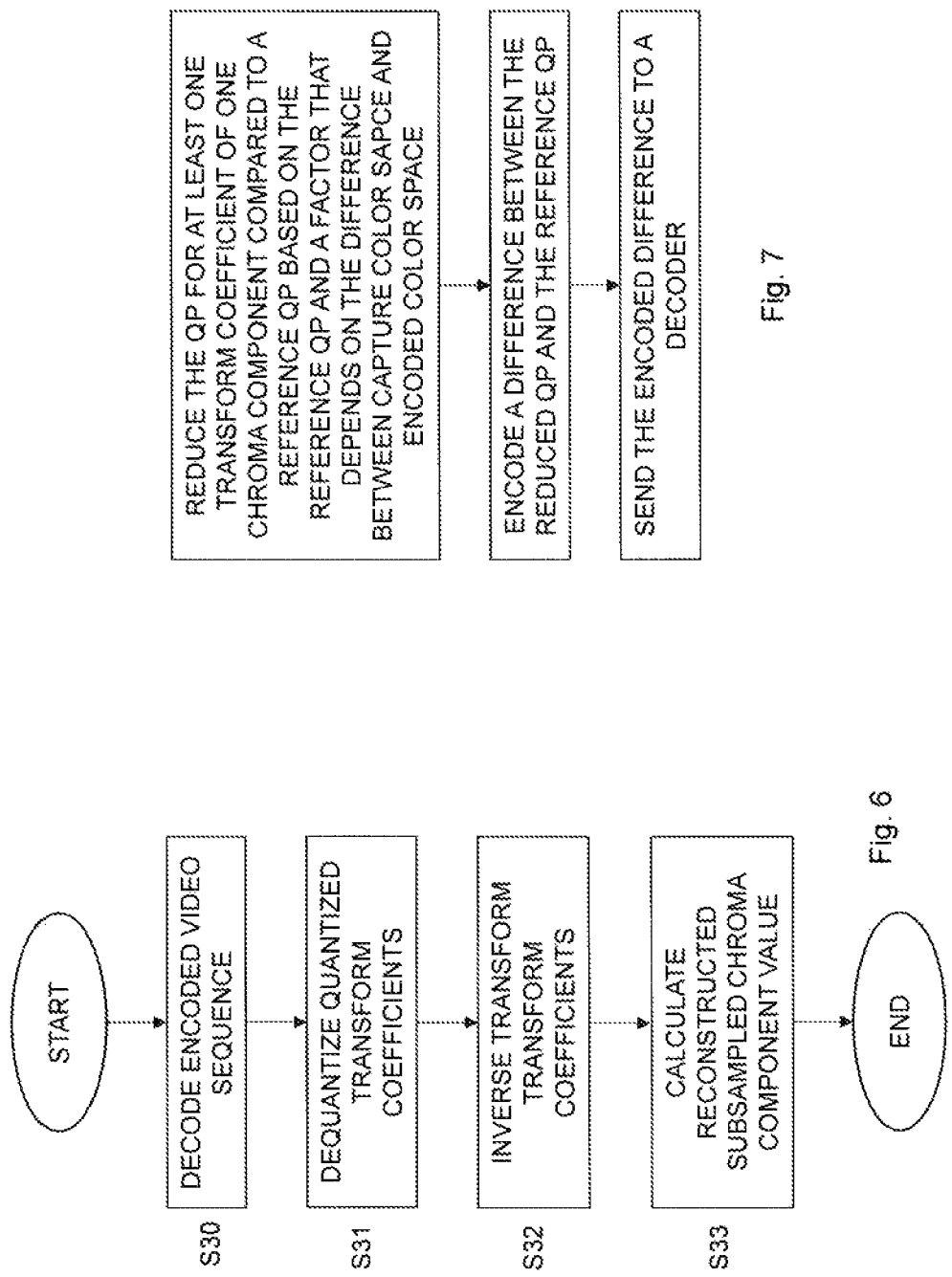

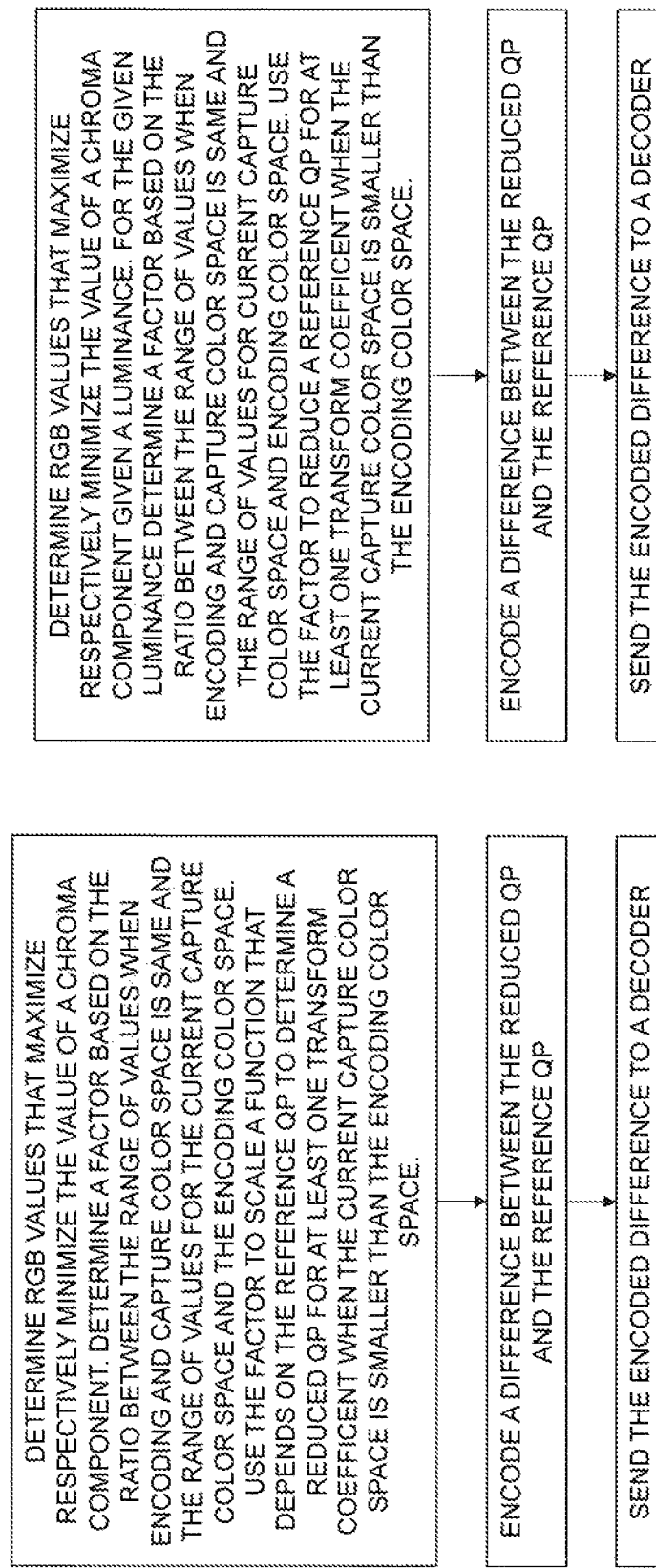

DETERMINATION OF QP VALUES

CROSS REFERENCE TO RELATED APPLICATION(S)

This application is a 35 U.S.C. § 371 National Stage of International Patent Application No. PCT/SE2016/050699, filed Jul. 7, 2016, designating the United States and claiming priority to U.S. provisional application No. 62/222,399, filed on Sep. 23, 2015. The above identified applications are incorporated by reference.

TECHNICAL FIELD

The present embodiments generally relate to methods and devices in video encoding and decoding, and in particular to determination of quantization parameter (QP) values in connection with video encoding and decoding.

BACKGROUND

High Dynamic Range (HDR) with Wide Color Gamut (WCG) has become an increasingly hot topic within the TV and multimedia industry in the last couple of years. While screens capable of displaying the HDR video signal is emerging at the consumer market, over-the-top (OTT) players, such as Netflix, has announced that HDR content will be delivered to the end-user. Standardization bodies are working on specifying the requirements for HDR. For instance, in the roadmap for DVB, UHDTV1 phase 2 will include HDR support. MPEG is currently working on exploring how HDR video could be compressed.

HDR imaging is a set of techniques within photography that allows for a greater dynamic range of luminosity compared to standard digital imaging. Dynamic range in digital cameras is typically measured in f-stops, where 1 f-stop is a doubling of the amount of light. A standard LCD HDTV using Standard Dynamic Range (SDR) can display less than or equal to 10 f-stops. HDR is defined by MPEG to have a dynamic range of over 16 f-stops. WCG is to increase the color fidelity from ITU-R 709 towards ITU-R 2020 such that more of the visible colors can be captured and displayed.

The amount of colors that is visible in different color spaces can be compared in the CIE 1931 XYZ color space as illustrated in FIG. 1. It can be seen that ITU-R 2020 (BT.2020) covers more of the visible color space than ITU-R 709 (BT.709). P3D65 (DCI P3) covers more than ITU-R 709 but less than ITU-R 2020.

Matrices have been defined that can convert red, green, blue (RGB) values for one color space into XYZ coordinates.

Since human vision is more sensitive to luminance than to chrominance, the chrominance is typically represented in lower resolution than the luminance. One format commonly used within video coding is Y'CbCr 4:2:0, also known as Y'UV 4:2:0. Here the Y' component contains mostly luminance (but also some chrominance) and is therefore denoted luma to set it apart from true luminance. Likewise, the Cb and Cr components contain mostly chrominance but also some luminance, and are therefore called chroma to set them apart from true chrominance. The 4:2:0 notation means that the chroma components (Cb, Cr) will have a quarter of the resolution compared to the luma component (Y'), since the eye is more sensitive to the latter. The Y'CbCr representation is obtained by transferring the original linear RGB values into a non-linear domain R'G'B' using a non-linear transfer function. Finally Y', Cb and Cr are obtained using linear combinations of R', G' and B'.

Before displaying samples, the chroma components are first upsampled to 4:4:4, i.e. the same resolution as the luma component, and then the luma and chroma components in Y'CbCr are converted to R'G'B' and then converted to linear domain (RGB) before being displayed.

Another approach is to encode RGB without any transformation to another color space but arrange the color components to mimic their respective relation to luminance and chrominance. Since green in RGB is more related to luminance than the red and blue color components another separation is to encode green as luminance and R and B as chrominance.

High Efficiency Video Coding (HEVC), also referred to as H.265, is a block based video codec standardized by ITU-T and MPEG that utilizes both temporal and spatial prediction. Spatial prediction is achieved using intra (I) prediction from within the current frame. Temporal prediction is achieved using inter (P) or bi-directional inter (B) prediction on block level from previously decoded reference pictures. The difference between the original pixel data and the predicted pixel data, referred to as the residual, is transformed into the frequency domain and quantized before transmitted together with necessary prediction parameters, such as mode selections and motion vectors.

By quantizing the transformed residuals the tradeoff between bitrate and quality of the video may be controlled. The level of quantization is determined by the QP. The QP is a key technique to control the quality/bitrate of the residual in video coding. It is applied such that it controls the fidelity of the residual, typically transform coefficients, and thus also controls the amount of coding artifacts. When QP is high the transform coefficients are quantized coarsely resulting in fewer bits but also typically more coding artifacts than when QP is small, where the transform coefficients are quantized finely. A low QP, thus, generally results in high quality and a high QP results in low quality.

In HEVC version 1 (v1), similarly also for H.264, the QP can be controlled at the picture level or at the slice level or at the block level. At picture and slice level it can be controlled individually for each color component, i.e. luma (Y') and chroma (Cb, Cr). In HEVC v2, the QP for chroma can be individually controlled for the chroma components at the block level. In the equations below it is shown how the chroma QP can be modified at the picture level by pps_cb_qp_offset and pps_cr_qp_offset and at the slice level by slice_cb_qp_offset and slice_cr_qp_offset. For HEVC v2 it can also be modified at the block level by CUQpOffsetCb and CUQpOffsetCr.

The variables qPCb and qPCr are derived as follows according to the HEVC specification [1], see equations 8-257 and 8-258 in [1]:

$$qPi_{Cb} = \text{Clip3}(-QpBd\text{Offset}_C, 57, Qp_Y + pps\_cb\_qp\_\text{offset} + \text{slice\_cb\_qp\_offset} + CuQp\text{Offset}_{Cb})$$

$$qPi_{Cr} = \text{Clip3}(-QpBd\text{Offset}_C, 57, Qp_Y + pps\_cr\_qp\_\text{offset} + \text{slice\_cr\_qp\_offset} + CuQp\text{Offset}_{Cr})$$

The function Clip3(a, b, c)=max(a, min(b, c)), max(a, b) is equal to a if a>b and otherwise b, and min(a, b) is equal to a if a<b and otherwise b.

If ChromaArrayType is equal to 1, which corresponds to 4:2:0, the variables $qP_{Cb}$ and $qP_{Cr}$ are set equal to the value of $Qp_C$ as specified in Table 1 below (corresponds to Table 8-10 in [1]) based on the index qPi equal to $qPi_{Cb}$ and $qPi_{Cr}$, respectively. Otherwise, the variables $qP_{Cb}$ and $qP_{Cr}$ are set equal to Min(qPi, 51), based on the index qPi equal to $qPi_{Cb}$ and $qPi_{Cr}$, respectively.

TABLE 1

Specification of QpC as a function of qPi for ChromaArrayType equal to 1

| $qPi_{Cb/Cr}$ | <30 | 30 | 31 | 32 | 33 | 34 | 35 | 46 | 37 | 38 | 39 | 40 | 41 | 42 | 43 | >43 |
|---|---|---|---|---|---|---|---|---|---|---|---|---|---|---|---|---|
| $qP_{Cb/Cr}$ | $=qPi_{Cb/Cr}$ | 29 | 30 | 31 | 32 | 33 | 33 | 34 | 34 | 35 | 35 | 36 | 36 | 37 | 37 | $=qPi_{Cb/Cr}-6$ |

The chroma quantization parameters for the Cb and Cr components, $Qp'_{Cb}$ and $Qp'_{Cr}$, are derived as follows (see equations 8-259 and 8-260 in [1]):

$$Qp'_{Cb}=qP_{Cb}+QpBdOffset_C$$

$$Qp'_{Cr}=qP_{Cr}+QpBdOffset_C$$

This is described further in section 8.6.1 in [1].

Typically more bits are spent on the luma component than on chroma components since the human visual system is more sensitive to luminance. The chroma components are typically represented in lower resolution than the luma component since the human perception is not as sensitive to chroma. Having the same QP for the chroma and luma components can, however, lead to visual color artifacts. These color artifacts tend to be more visible for HDR video than for SDR video. However, it is not a solution to always use a lower QP value for the chroma components than for the luma component. This can result in encoding the chroma components unnecessarily well, especially at high bit rates (low QPs), thereby spending bits on chroma without visually improving the color.

There is, thus, a need for an efficient calculation of QP values for chroma components that solve at least some of the above-mentioned problems.

SUMMARY

An objective of the embodiments is to provide an efficient calculation of QP values for chroma components.

This and other objectives are met by embodiments disclosed herein.

An embodiment relates to a method of calculating a QP value for a chroma component of a pixel in a picture comprising a plurality of pixels in a video sequence comprising a plurality of pictures. The method comprises calculating a QP offset value for the chroma component based on a reference QP value and a factor that depends on a difference between a capture color space for the pixel and an encoded color space for the pixel. The method also comprises calculating the QP value for the chroma component based on the reference QP value reduced by the QP offset value.

Another embodiment comprises a method of calculating a QP value for a chroma component Cb and/or Cr of a pixel in a picture comprising a plurality of pixels in a video sequence comprising a plurality of pictures. The method comprises calculating a QP offset value for the chroma component Cb and/or Cr based on max(−12, round(c_cb× (k×refQP+m))) and/or max(−12, round(c_cr×(k×refQP+ m))). k is a chroma scaling factor, m is a chroma offset, refQP is a reference QP value, c_cb=1 and c_cr=1 if a capture color space for the pixel is same as an encoded color space for the pixel, c_cb=1.04 and c_cr=1.39 if the capture color space is P3D65 and the encoded color space is ITU-R 2020, c_cb=1.14 and c_cr=1.78 or 1.79 if the capture color space is ITU-R 709 and the encoded color space is ITU-R 2020, max(a, b) is equal to a if a>b and otherwise equal to b, round(a) rounds a to the nearest integer. The method also comprises calculating the QP value for the chroma component Cb and/or Cr based the reference QP value reduced by the QP offset value.

A further embodiment relates to a method for encoding a video sequence comprising a plurality of pictures. Each picture comprises a plurality of pixels and each pixel is associated with a luma component value and two sub-sampled chroma component values. The method comprises calculating, for a pixel in a picture of the video sequence, a residual based on a difference between a subsampled chroma component value and a predicted chroma component value. The method also comprises transforming the residual into a frequency domain to obtain transform coefficients. The method further comprises calculating a QP value for the chroma component according to any of the embodiments above. The method additionally comprises quantizing the transform coefficients, wherein a level of quantization is determined by the QP value.

Another embodiment relates to a method for decoding an encoded video sequence comprising a plurality of pictures. Each picture comprises a plurality of pixels and each pixel is associated with a luma component value and two sub-sampled chroma component values. The method comprises decoding the encoded video sequence to obtain quantized transform coefficients and a QP offset value for a chroma component of a pixel, the QP offset value depends on a reference QP value and a factor that depends on a difference between a capture color space for the pixel and an encoded color space for the pixel. The method also comprises dequantizing the quantized transform coefficients using a QP value calculated based on the reference QP value reduced by the QP offset value to obtain transform coefficients. The method further comprises inverse transforming the transform coefficients to obtain a residual, and calculating a reconstructed subsampled chroma component value based on the residual and a predicted chroma component value.

An embodiment relates to a device for calculating a QP value for a chroma component of a pixel in a picture comprising a plurality of pixels in a video sequence comprising a plurality of pictures. The device is configured to calculate a QP offset value for the chroma component based on a reference QP value and a factor that depends on a difference between a capture color space for the pixel and an encoded color space for the pixel. The device is also configured to calculate the QP value for the chroma component based on the reference QP value reduced by the QP offset value.

Another embodiment relates to a device for calculating a QP value for a chroma component Cb and/or Cr of a pixel in a picture comprising a plurality of pixels in a video sequence comprising a plurality of pictures. The device is configured to calculate a QP offset value for the chroma component Cb and/or Cr based on max(−12, round(c_cb× (k×refQP+m))) and/or max(−12, round(c_cr×(k×refQP+ m))). k is a chroma scaling factor, m is a chroma offset, refQP is a reference QP value, c_cb=1 and c_cr=1 if a capture color space for the pixel is same as an encoded color space for the pixel, c_cb=1.04 and c_cr=1.39 if the capture color space is P3D65 and the encoded color space is ITU-R 2020, c_cb=1.14 and c_cr=1.78 or 1.79 if the capture color space is ITU-R 709 the encoded color space ITU-R 2020, max(a, b) is equal to a if a>b and otherwise equal to b, round(a) rounds a to the nearest integer. The device is also configured to calculate the QP value for the chroma component Cb based the reference QP value reduced by the QP offset value.

A further embodiment relates to a device for calculating a QP value for a chroma component of a pixel in a picture comprising a plurality of pixels in a video sequence comprising a plurality of pictures. The device comprises a QP offset calculator for calculating a QP offset value for the chroma component based on a reference QP value and a factor that depends on a difference between a capture color space for the pixel and an encoded color space for the pixel. The device also comprises a QP calculator for calculating the QP value for the chroma component based on the reference QP value reduced by the QP offset value.

Yet another embodiment relates to a device for calculating a QP value for a chroma component Cb and/or Cr of a pixel in a picture comprising a plurality of pixels in a video sequence comprising a plurality of pictures. The device comprises a QP offset calculator for calculating a QP offset value for the chroma component Cb and/or Cr based on max(−12, round(c_cb×(k×refQP+m))) and/or max(−12, round(c_cr×(k×refQP+m))). k is a chroma scaling factor, l is a chroma offset, refQP is a reference QP value, c_cb=1 and c_cr=1 if a capture color space for the pixel is same as an encoded color space for the pixel, c_cb=1.04 and c_cr=1.39 if the capture color space is P3D65 and the encoded color space is ITU-R 2020, c_cb=1.14 and c_cr=1.78 or 1.79 if the capture color space is ITU-R 709 and the encoded color space is ITU-R 2020, max(a, b) is equal to a if a>b and otherwise equal to b, round(a) rounds a to the nearest integer. The device also comprises a QP calculator for calculating the QP value for the chroma component Cb based the reference QP value reduced by the QP offset value.

A further embodiment relates to an encoder for encoding a video sequence comprising a plurality of pictures. Each picture comprises a plurality of pixels and each pixel is associated with a luma component value and two sub-sampled chroma component values. The encoder is configured to calculate, for a pixel in a picture of the video sequence, a residual based on a difference between a sub-sampled chroma component value and a predicted chroma component value. The encoder is also configured to transform the residual into a frequency domain to obtain transform coefficients. The encoder comprises a device for calculating a QP value according to any of the embodiments above. The device is configured to calculate a QP value for the chroma component. The encoder is further configured to quantize the transform coefficients, wherein a level of quantization is determined by the QP value.

Yet another embodiment relates to an encoder for encoding a video sequence comprising a plurality of pictures. Each picture comprises a plurality of pixels and each pixel is associated with a luma component value and two sub-sampled chroma component values. The encoder comprise an encoding module for calculating, for a pixel in a picture of the video sequence, a residual based on a difference between a subsampled chroma component value and a predicted chroma component value. The encoding module is also for transforming the residual into a frequency domain to obtain transform coefficients and quantizing the transform coefficients, wherein a level of quantization is determined by a QP value. The encoder also comprises a reduction module for calculating the QP value for the chroma component based on a reference QP value reduced by a QP offset value calculated for the chroma component based on the reference QP value and a factor that depends on a difference between a capture color space for the pixel and an encoded color space for the pixel.

Another embodiment relates to a decoder for decoding an encoded video sequence comprising a plurality of pictures. Each picture comprises a plurality of pixels and each pixel is associated with a luma component value and two sub-sampled chroma component values. The decoder is configured to decode the encoded video sequence to obtain quantized transform coefficients and a QP offset value for a chroma component of a pixel. The QP offset value depends on a reference QP value and a factor that depends on a difference between a capture color space for the pixel and an encoded color space for the pixel. The decoder is also configured to dequantize the quantized transform coefficients using a QP value determined based on the reference QP value reduced by the QP offset value to obtain transform coefficients. The decoder is further configured to inverse transform the transform coefficients to obtain a residual and calculate a reconstructed subsampled chroma component value based on the residual and a predicted chroma component value.

Yet another embodiment relates to a decoder for decoding an encoded video sequence comprising a plurality of pictures. Each picture comprises a plurality of pixels and each pixel is associated with a luma component value and two subsampled chroma component values. The decoder comprises a decoding module for decoding the encoded video sequence to obtain quantized transform coefficients and a QP offset value for a chroma component of a pixel. The QP offset value depends on a reference QP value and a factor that depends on a difference between a capture color space for the pixel and an encoded color space for the pixel. The decoder also comprises a dequantizing module for dequantizing the quantized transform coefficients using a QP value calculated based on the reference QP value reduced by the QP offset value to obtain transform coefficients. The decoder further comprises an inverse transforming module for inverse transforming the transform coefficients to obtain a residual. The decoder additionally comprises a calculating module for calculating a reconstructed subsampled chroma component value based on the residual and a predicted chroma component value.

An embodiment relates to a user equipment comprising a device according to any of the embodiments above, an encoder according to any of the embodiments above or a decoder according to any of the embodiments above. The user equipment is selected from a group consisting of a video camera, a computer, a laptop, a smart phone, a tablet and a set-top box.

An embodiment relates to a computer program comprising instructions, which when executed by a processor, cause the processor to calculate a QP offset value, for a chroma component of a pixel in a picture comprising a plurality of pixels in a video sequence comprising a plurality of pictures, based on a reference QP value and a factor that depends on a difference between a capture color space for the pixel and an encoded color space for the pixel. The processor is also caused to calculate a QP value for the chroma component based on the reference QP value reduced by the QP offset value.

Another embodiment relates to a computer program comprising instructions, which when executed by a processor, cause the processor to calculate a QP offset value, for a chroma component Cb and/or Cr of a pixel in a picture comprising a plurality of pixels in a video sequence comprising a plurality of pictures, based on max(−12, round (c_cb×(k×refQP+m))) and/or max(−12, round(c_cr×(k× refQP+m))). k is a chroma scaling factor, m is a chroma offset, refQP is a reference QP value, c_cb=1 and c_cr=1 if a capture color space for the pixel is same as an encoded color space for the pixel, c_cb=1.04 and c_cr=1.39 if the capture color space is P3D65 and the encoded color space is ITU-R 2020, c_cb=1.14 and c_cr=1.78 or 1.79 if the capture color space is ITU-R 709 the encoded color space is ITU-R 2020, max(a, b) is equal to a if a>b and otherwise equal to b, round(a) rounds a to the nearest integer. The processor is also caused to calculate a QP value for the chroma component Cb and/or Cr based the reference QP value reduced by the QP offset value.

A further embodiment relates to a computer program comprising instructions, which when executed by a processor, cause the processor to decode an encoded video sequence comprising a plurality of pictures, wherein each picture comprises a plurality of pixels and each pixel is associated with a luma component value and two sub-sampled chroma component values, to obtain quantized transform coefficients and a QP offset value for a chroma component of a pixel. The QP offset value depends on a reference QP value and a factor that depends on a difference between a capture color space for the pixel and an encoded color space for the pixel. The processor is also caused to dequantize the quantized transform coefficients using a QP value determined based on the reference QP value reduced by the QP offset value to obtain transform coefficients. The processor is further caused to inverse transform the transform coefficients to obtain a residual calculate a reconstructed subsampled chroma component value based on the residual and a predicted chroma component value.

Yet another embodiment relates to a computer program comprising instructions, which when executed by a processor, cause the processor to calculate, for a pixel of in a picture of a video sequence comprising a plurality of pictures, each picture comprises a plurality of pixels and each pixel is associated with a luma component value and two subsampled chroma component values, a residual based on a difference between a subsampled chroma component value and a predicted chroma component value. The processor is also caused to transform the residual into a frequency domain to obtain transform coefficients. The processor is further caused to quantize the transform coefficients, wherein a level of quantization is determined by a QP value. The processor is additionally caused to calculate the QP value for said chroma component based on a reference QP value reduced by a QP offset value calculated for the chroma component based on the reference QP value and a factor that depends on a difference between a capture color space for the pixel and an encoded color space for the pixel.

An embodiment relates to a carrier comprising a computer program according to any of the embodiments above. The carrier is one of an electronic signal, an optical signal, an electromagnetic signal, a magnetic signal, an electric signal, a radio signal, a microwave signal, or a computer-readable storage medium.

An advantage of the embodiments is that the color quality is improved, either from less noticeable chroma blocking artifacts or in general better chroma quality. The embodiments may be applied both for HDR and SDR video. However, the improvement may in general be larger for HDR video, since it generally contains a larger variety of chroma information.

BRIEF DESCRIPTION OF THE DRAWINGS

The embodiments, together with further objects and advantages thereof, may best be understood by making reference to the following description taken together with the accompanying drawings, in which:

FIG. 6 is a flow chart illustrating a method for decoding an encoded video sequence according to an embodiment;

FIG. 7 is a flow chart illustrating an embodiment of calculating a QP value;

FIG. 8 is a flow chart illustrating another embodiment of calculating a QP value;

FIG. 9 is a flow chart illustrating a further embodiment of calculating a QP value;

DETAILED DESCRIPTION

Figure 1:
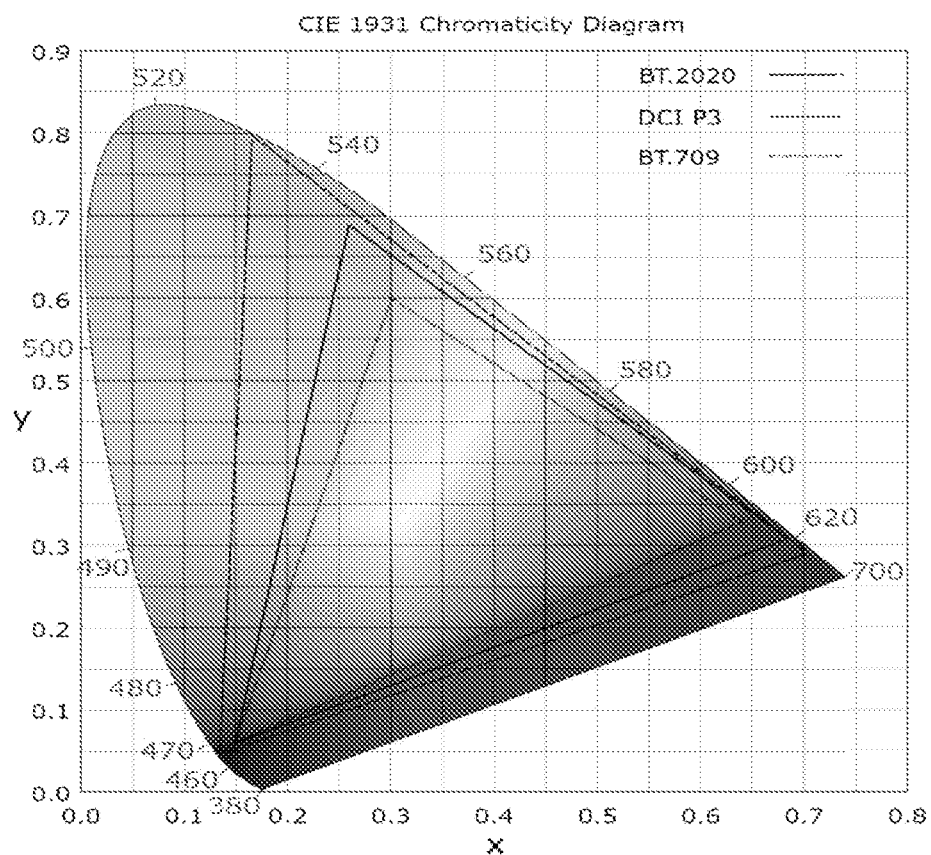
FIG. 1 illustrates coverage of BT.2020, DCI P3 and BT.709 in a CIE 1931 XYZ chromaticity diagram.

Throughout the drawings, the same reference numbers are used for similar or corresponding elements.

The present embodiments generally relate to methods and devices in video encoding and decoding, and in particular to determination of quantization parameter (QP) values in connection with video encoding and decoding.

The prior art technology of calculating QP values for chroma components (Cb, Cr) involve calculating the QP value based on the QP value ($Qp_Y$) for the luma component (Y'). The QP value for the chroma components can, however, be modified on a picture level by the parameters pps_cb_qp_offset and pps_cr_qp_offset, on a slice level by the parameters slice_cb_qp_offset and slice_cr_qp_offset and, in HEVC v2, on a block level by the parameters $CuQpOffset_{Cb}$ and $CuQpOffset_{Cr}$.

Having the same QP values for the chroma and luma components may lead to visual color artifacts, which become particularly visible in the case of HDR video. However, consistently using larger QP values for chroma components as compared to the luma component may, since the chroma components are typically represented in lower resolution than the luma component, quantize the residuals to the chroma components too heavily resulting in visible color artifacts. Worse, consistently using larger QP values for chroma components as compared to the luma components will increase these color artifacts further.

However, to always use lower QP values for the chroma components than for the luma component can result in encoding the chroma components unnecessarily well, especially at high bit rates, thereby spending bits on the chroma components without visually improving the color. These bits could have made more use in the luma component.

The present embodiments provide an efficient calculation of QP values for chroma components that solve or at least mitigate some of the above-mentioned shortcoming of the prior art QP calculation.

A color space or color domain is the type and number of colors that originate from the combinations of color components of a color model. A color model is an abstract configuration describing the way colors can be represented as tuples of numbers, i.e. color components. The color components have several distinguishing features such as the component type, e.g. hue, and its unit, e.g. degrees or percentage, or the type of scale, e.g. linear or non-linear, and its intended number of values referred to as the color depth or bit depth.

Non-limiting, but illustrative, color domains that are commonly used for pixels in pictures and videos include the red, green, blue (RGB) color domain, the luma, chroma blue and chroma red (Y'CbCr, sometimes denoted Y'CbCr, Y'Cb'Cr', $YC_BC_R$, $Y'C_BC_R$ $Y'C_B'C_R'$ or YUV, Yuv, or $D'_YD'_{CB}D'_{CR}$ or $E'_YE'_{CB}E'_{CR}$) color domain and the luminance and chrominances (XYZ) color domain.

The following terminology is used in the text below:

Y'CbCr: Luma (Y') and chroma (Cb, Cr) components. Y' is distinguished from luminance (Y) meaning that light intensity is non-linearly encoded based on gamma corrected or perceptually quantized RGB primaries.

RGB: Red, Green and Blue components, typically linear samples.

XYZ: Linear combinations of RGB, which describe luminance in Y and chrominance in X and Z.

4:2:0: The second and third components have been subsampled horizontally and vertically by a factor of two compared to the first component.

4:4:4: All three components are in full resolution.

Figure 2:
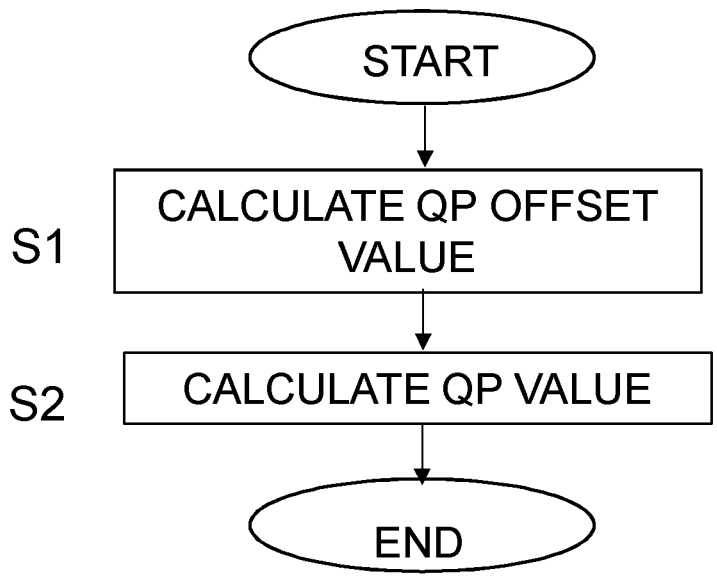
FIG. 2 is a flow chart illustrating a method of calculating a QP value according to an embodiment.

FIG. 2 is a flow chart illustrating a method of calculating a QP value for a chroma component of a pixel in a picture comprising a plurality of pixels in a video sequence comprising a plurality of pictures. The method starts in step S1, which comprises calculating a QP offset value for the chroma component based on a reference QP value and a factor that depends on a difference between a capture color space for the pixel and an encoded color space for the pixel. A following step S2 then comprises calculating the QP value for the chroma component based on the reference QP value reduced by the QP offset value.

Thus, according to the present embodiments a QP offset value is calculated and used to modify the reference QP value in order to determine the QP value for the chroma component. The QP offset value is in turn determined based on a factor that depends on the difference between the capture and encoded color spaces for the pixel.

The reduction of the QP value by the QP offset value in step S2 implies that the QP value is lower than the reference QP value. Thus, in an embodiment QP value=reference QP value−QP offset value, in which case the QP offset value is a positive value. This is equivalent to QP value=reference QP value+QP offset value if the QP offset value is a negative value.

The embodiments are based on the finding that the prior art solution of setting QP values for chroma components may actually clean out, i.e. too heavily quantize, the chroma coefficients or residuals, in particular when the capture color space is smaller than the encoded color space. The embodiments thereby calculate the QP values for the chroma components based on a relation, i.e. difference, between the capture color space and the encoded color space as represented by the factor used to calculate the QP offset value in step S1.

The effect on Y'CbCr components when we capture in one color space and encode in another color space can be examined by conversion via the XYZ color space. If a color is captured in one color space, for example ITU-R 709, it can be converted to the XYZ color space and then to ITU-R 2020 color space. Thus, if a color is captured in ITU-R 709 and then encoded and represented in, for instance ITU-R 2020, the maximum luma magnitude is preserved. However the maximum chroma magnitudes will be reduced. The maximum Cr magnitude is reduced from 0.5 (given in float representation) to 0.28 and the maximum Cb magnitude is reduced from 0.5 to 0.44. Correspondingly, if the color is captured in P3D65 and encoded and represented in ITU-R 2020, the maximum luma magnitude is again preserved and the maximum Cr magnitude is reduced from 0.5 to 0.36 and the maximum Cb magnitude is reduced from 0.5 to 0.48. If the energy of a Cr component in a block of pixels goes down, measured as the sum of $(Cr)^2$ over the pixels in the block, this will mean that the energy of the transform coefficients of the block will also go down. This is a consequence of Parseval's theorem, which states that the energy in a block of pixels is preserved for a unitary transform. Since the transform coefficients are effectively divided by the QP value before being losslessly encoded, fewer transform coefficients will survive the encoding if the energy of the block goes down (the transform coefficients become smaller). This can be counteracted by reducing the QP value for the chroma component. Note that no such squeezing of the magnitude of the luma component takes place. Hence there is no need to reduce the QP for the luma component. Thus, larger negative chroma offsets are needed to prevent too strong quantization or even a complete cleaning out of the chroma components when the capture color space is smaller than the encoded color space.

The method steps S1 and S2 of FIG. 2 could be performed for one chroma component, such as the Cb component or the Cr component, or indeed for both chroma components, i.e. both the Cb and Cr components. In the latter case, the same QP offset value could be calculated for both chroma components in step S1. However, as is further described herein, it is generally preferred to calculate a QP offset value for the Cb component and another QP offset value for the Cr component.

The QP offset value and the QP value are calculated in steps S1 and S2 for at least one pixel in the picture. The QP offset value and the QP value are preferably calculated in steps S1 and S2 for a group of pixels in the picture. This group of pixels could be a block of pixels, sometimes referred to as coding unit (CU), in the picture. Such a block of pixels could, in illustrative but non-limiting examples, be a block of 4×4 pixel, 8×8 pixels, 16×16 pixels, 32×32 pixels, or even larger, such as 64×64 pixels.

In another embodiment, the group of pixels is a slice of the picture. Generally, slices can be defined as self-contained portions of a picture in that prediction is not made across slice boundaries. Slices are coding tree units (CTUs) encoded and decoded in the order of the raster scan, and different coding types can be used for slices, such as I slices, P slices, or B slices. A picture can consist of a single slice but is generally composed of multiple, i.e. at least two, slices.

A further embodiment is that the steps S1 and S2 are performed once for all pixels in the picture. In this embodiment, the group of pixels thereby corresponds to all pixels in the picture.

The QP offset value calculated in step S1 could therefore be the value of the previously mentioned parameter $CuQpOffset_{Cb}$ or $CuQpOffset_{Cr}$ if step S1 is performed once for the pixels within a block of pixels, the value of the parameter slice_cb_qp_offset or slice_cr_qp_offset if step S1 is performed once for the pixels within a slice, or the value of the parameter pps_cb_qp_offset or pps_cr_qp_offset if step S1 is performed once for all pixels within the picture. In these examples, the same parameter terms as previously used in the art have been employed to denote the QP offsets. However, in the art, the values of these parameters have not been determined based on a reference QP value and a factor that depends on a difference between capture and encoded color spaces.

In an embodiment, step S1 comprises, for a given chroma component Cb, Cr, calculating the QP offset value for a block of pixels in the picture, i.e. calculating the value of $CuQpOffset_{Cb}$ or $CuQpOffset_{Cr}$, calculating the QP offset value for a slice in the picture, i.e. calculating the value of slice_cb_qp_offset or slice_cr_qp_offset, or calculating the QP offset value for the entire picture, i.e. calculating the value of pps_cb_qp_offset or pps_cr_qp_offset, based on the reference QP value and the factor that depends on the difference between the capture color space and the encoded color space for the pixels in the block of pixels, in the slice or in the picture. Thus, in such an embodiment a single QP offset value is calculated for a given pixel within the picture and a given chroma component based on the reference QP value and the factor.

In an alternative embodiment, a single QP offset value is calculated for a given pixel within the picture and a given chroma component based on the reference QP value and the factor. In this alternative embodiment, at least one other QP offset value that is applicable to the given pixel and given chroma component value could be provided, such as determined according to the prior art techniques, i.e. not based on a reference QP value and the factor that depends on a difference between the capture color space and the encoded color space. An example of prior art technique is to determine the QP offset based on the variance so that pixels or samples that vary much is given a larger QP offset than samples that vary little.

For instance, the value of one of the parameters $CuQpOffset_{Cb}$, slice_cb_qp_offset, pps_cb_qp_offset or $CuQpOffset_{Cr}$, slice_cr_qp_offset, pps_cr_qp_offset could be calculated in step S1 above, whereas the values of the other two parameters or one of the other two parameters could be determined according to prior art techniques. For instance, the value of $CuQpOffset_{Cb}$ or $CuQpOffset_{Cr}$ is calculated according to step S1, whereas the value(s) of slice_cb_qp_offset and/or pps_cb_qp_offset or slice_cr_qp_offset and/or pps_cr_qp_offset is(are) determined according to prior art techniques. Alternatively, the value of slice_cb_qp_offset or slice_cb_qp_offset is calculated according to step S1, whereas the value(s) of $CuQpOffset_{Cb}$ and/or pps_cb_qp_offset or $CuQpOffset_{Cr}$ and/or pps_cr_qp_offset is(are) determined according to prior art techniques. A further variant involves calculating the value of pps_cb_qp_offset or pps_cr_qp_offset according to step S1, whereas the value(s) of $CuQpOffset_{Cb}$ and/or slice_cb_qp_offset or $CuQpOffset_{Cr}$ and/or slice_cb_qp_offset is(are) determined according to prior art techniques.

In an alternative embodiment, at least two QP offset values are calculated in step S1 for the given pixel and for the given chroma component. For instance, step S1 could comprise calculating the values of the parameter $CuQpOffset_{Cb}$ or $CuQpOffset_{Cr}$ and the parameter slice_cb_qp_offset or slice_cr_qp_offset, or the parameter $CuQpOffset_{Cb}$ or $CuQpOffset_{Cr}$ and the parameter pps_cb_qp_offset or pps_cr_qp_offset, or the parameter slice_cb_qp_offset or slice_cr_qp_offset and the parameter pps_cb_qp_offset or pps_cr_qp_offset, or the parameter $CuQpOffset_{Cb}$ or $CuQpOffset_{Cr}$, the parameter slice_cb_qp_offset or slice_cr_qp_offset and the parameter pps_cb_qp_offset or pps_cr_qp_offset based on the reference QP value and the factor that depends on the difference between the capture color space for the pixel and the encoded color space. Optionally and for the examples except the last one involving calculating three parameter values, the value of the third remaining parameter could be determined according to prior art techniques.

The QP offset value is calculated in step S1 based on the reference QP value and a factor that depends on a difference between color spaces. As is shown in FIG. 1, there are different color spaces available for representing color values of pixels in pictures of a video sequence. FIG. 1 illustrates three such color spaces ITU-R 2020, also referred to as BT.2020 or Rec. 2020; ITU-R 709, also referred to as BT.709 or Rec. 709; P3D65, also referred to as DCI P3. There are also other color spaces, such as ITU-R 601, also referred to as BT.601 or Rec. 601. Another example is if the encoding color space is the YDzDx color space, in which a chroma QP offset values may be needed for the Dz and Dx components, if the capture color space is in ITU-R 709, P3D65 or ITU-R 2020.

ITU-R 2020 is a color space defined for ultra-high-definition television (UHDTV) and defines a bit depth of either 10-bits per sample or 12-bits per sample. In 10-bits per sample ITU-R 2020, the range of Y' values is [64, 940] and the range of Cb and Cr values is [64, 960]. In 12-bits per sample ITU-R 2020, the range of Y' values is [256, 3760] and the range of Cb and Cr values is [256, 3840]. The ITU-R 2020 color space can reproduce some colors that cannot be shown with the ITU-R 709 color space. The RGB primaries used by ITU-R 2020 are equivalent to monochromatic light sources on the CIE 1931 spectral locus. The wavelength of the ITU-R 2020 primary colors is 630 nm for the red primary color, 532 nm for the green primary color, and 467 nm for the blue primary color. ITU-R 2020 allows for RGB and Y'CbCr signal formats with 4:4:4, 4:2:2, and 4:2:0 chroma subsampling.

ITU-R 709 standardizes the format of high-definition television (HDTV), having 16:9 (widescreen) aspect ratio. ITU-R 709 uses either 8 bits or 10 bits per sample in each color channel. In the 8-bit representation, the range of Y' values is [16, 235] and the range of Cb and Cr values is [16, 240]. In 10-bits per sample, the range of Y' values is [64, 940] and the range of Cb and Cr values is [64, 960].

P3D65 is a common color space for digital movie projection from the US-American film industry. P3D65 uses either 8 bits or 10 bits per sample in each color channel. In the 8-bit representation, the range of Y' values is [16, 235] and the range of Cb and Cr values is [16, 240]. In 10-bits per sample, the range of Y' values is [64, 940] and the range of Cb and Cr values is [64, 960].

ITU-R 601 standardizes the format of standard definition television (SDTV). ITU-R 601 uses either 8 bits or 10 bits per sample in each color channel. In the 8-bit representation, the range of Y' values is [16, 235] and the range of Cb and Cr values is [16, 20]. In 10-bits per sample, the range of Y' values is [64, 940] and the range of Cb and Cr values is [64, 960].

The color spaces as used herein could be a capture color space or an encoded color space. This is to differentiate the color space used for capturing video or pre-processing the video prior to encoding as compared to the color space used for encoding the video and typically decoding and displaying the video.

In an embodiment, capture color space as used herein is the color space employed by the camera used to record the video sequence. However, capture color space as used herein also encompasses the color space of the video sequence during pre-processing that may be applied to the video sequence prior to encoding the video sequence. For instance, a camera may use the ITU-R 709 color space for recording a video sequence. This video sequence may then pre-processed by applying, for instance, color grading on a monitor having a larger color space, such as P3D65. Such color grading involves modifying the video sequence slightly to improve the visual effects, such as increasing the saturation in some colors, for instance making the grass look greener in a video sequence of a football match. The resulting color space may in this case be P3D65 rather than ITU-R 709. Also such pre-processing of the video sequence prior to encoding is encompassed in the expression capture color space as used herein.

Accordingly, assume a video is recorded by a camera in ITU-R 709 but is then pre-processed, such as using color grading, in P3D65. The video is then encoded in ITU-R 2020. In such a case, the capture color space is P3D65 and the encoded color space is ITU-R 2020.

The encoded color space, or as also used herein, the representation color space is the color space used for encoding the video sequence and preferably also decoding and presenting or representing the video sequence.

Figure 3:
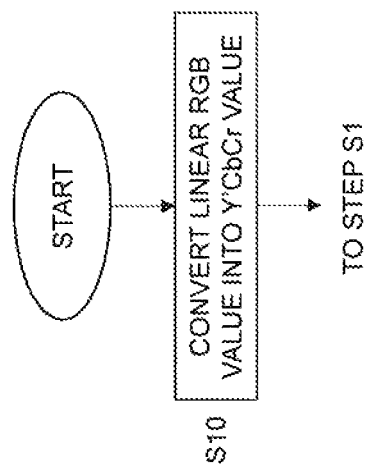
FIG. 3 is a flow chart illustrating an additional, optional step of the method shown in FIG. 2 according to an embodiment.

FIG. 3 is a flow chart illustrating an additional, optional step of the method shown in FIG. 2. The method starts in step S10, which comprises converting a linear red, green, blue (RGB) value of the pixel in the capture color space into a luma component value (Y') and two subsampled chroma component values (Cb, Cr) in the encoded color space. In this embodiment, the chroma component is a chroma component for one of the two subsampled chroma component values.

Thus, FIG. 3 illustrates one embodiment of the relationship between a capture color space and an encoded color space. In this embodiment, the pixels of the picture in the video sequence are each represented by an RGB value 4:4:4 in the capture color space. These respective RGB values in the capture color space are converted into Y'CbCr values 4:2:0 or 4:2:2 in the encoded color space. The chroma component for which the QP offset value and the QP value are calculated in steps S1 and S2 is then one of these chroma components of the Y'CbCr value 4:2:0 or 4:2:2.

The conversion from RGB value 4:4:4 into Y'CbCr value 4:2:0 or 4:2:2 typically involves converting the RGB 4:4:4 value from the capture color space to a RGB 4:4:4 value in the encoded color space. This color space conversion typically involves converting the RGB value 4:4:4 in the capture color space into a XYZ value using equation 1 and then using the inverse of the matrix in equation 1 to convert the XYZ value into a RGB value 4:4:4 in the encoded color space. The values of the matrix elements ($b_{11}$-$b_{33}$) depend on the particular capture color space and the particular encoded color space. The RGB 4:4:4 value in the encoded color space is then input into an inverse transfer function, such the inverse of the transfer function in equation 2 or as described in [2], to get a non-linear R'G'B' value 4:4:4. A color transform, see equation 3, is then applied to the R'G'B' value 4:4:4 to get a Y'CbCr value 4:4:4 in the encoded color space. Then, the two chroma components CbCr are subsampled to 4:2:0 or 4:2:2 to get the Y'CbCr value 4:2:0 or 4:2:2.

$$\begin{bmatrix} X \\ Y \\ Z \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} R \\ G \\ B \end{bmatrix} \quad \text{(equation 1)}$$

The values of the matrix elements $b_{11}$-$b_{13}$ depend on the capture color space, when going from a RGB 4:4:4 value into a XYZ value, and on the encoded capture color space, when going from a XYZ value into a RGB 4:4:4 value. For ITU-R 709: $b_{11}$=0.412391, $b_{12}$=0.357584, $b_{13}$=0.180481, $b_{21}$=0.212639, $b_{22}$=0.715169, $b_{23}$=0.072192, $b_{31}$=0.019331, $b_{32}$=0.119195, $b_{33}$=0.950532; for ITU-R 2020: $b_{11}$=0.636958, $b_{12}$=0.144617, $b_{13}$=0.168881, $b_{21}$=0.262700, $b_{22}$=0.677998, $b_{23}$=0.059302, $b_{31}$=0.000000, $b_{32}$=0.028073, $b_{33}$=1.060985; for P3D65: $b_{11}$=0.486571, $b_{12}$=0.265668, $b_{13}$=0.198217, $b_{21}$=0.228975, $b_{22}$=0.691739, $b_{23}$=0.079287, $b_{31}$=0.00000, $b_{32}$=0.045113, $b_{33}$=1.043944; and for ITU-R 601: $b_{11}$=0.430554, $b_{12}$=0.341550, $b_{13}$=0.178352, $b_{21}$=0.222004, $b_{22}$=0.706655, $b_{23}$=0.071341, $b_{31}$=0.020182, $b_{32}$=0.129553, $b_{33}$=0.939322.

$$Y = L_p \left( \frac{\max[(V^{1/m} - c_1), 0]}{c_2 - c_3 V^{1/m}} \right)^{1/n} \quad \text{(equation 2)}$$

$$n = \frac{2610}{4096} \times \frac{1}{4} \approx 0.15930176$$

$$m = \frac{2523}{4096} \times 128 = 78.84375 \quad \text{(equation 3)}$$

$$c_1 = c_3 - c_2 + 1 = \frac{3424}{4096} = 0.8359375$$

$$c_2 = \frac{2413}{4096} \times 32 = 18.8515625$$

-continued $$c_3 = \frac{2392}{4096} \times 32 = 18.6875$$

$$L_p = 10000 \frac{cd}{m^2}$$

$$Y' = a_{11} \times R' + a_{12} \times G' + a_{13} \times B'$$

$$Cb = a_{21} \times R' + a_{22} \times G' + a_{23} \times B'$$

$$Cr = a_{31} \times R' + a_{32} \times G' + a_{33} \times B'$$

wherein, for ITU-R 709: $a_{11}$=0.212600, $a_{12}$=0.715200, $a_{13}$=0.072200, $a_{21}$=−0.114572, $a_{22}$=−0.385428, $a_{23}$=0.500000, $a_{31}$=0.500000, $a_{32}$=−0.454153, $a_{33}$=−0.045847; for ITU-R 2020: $a_{11}$=0.262700, $a_{12}$=0.678000, $a_{13}$=0.059300, $a_{21}$=−0.139630, $a_{22}$=−0.360370, $a_{23}$=0.500000, $a_{31}$=0.500000, $a_{32}$=−0.459786, $a_{33}$=−0.040214; for P3D65: $a_{11}$=0.2096, $a_{12}$=0.7215, $a_{13}$=0.0690, $a_{21}$=−0.1125, $a_{22}$=−0.3875, $a_{23}$=0.5000, $a_{31}$=0.5000, $a_{32}$=−0.4564, $a_{33}$=−0.0436; and for ITU-R 601: $a_{11}$=0.299000, $a_{12}$=0.587000, $a_{13}$=0.114000, $a_{21}$=−0.168736, $a_{22}$=−0.331264, $a_{23}$=0.500000, $a_{31}$=0.500000, $a_{32}$=−0.418688, $a_{33}$=−0.081312.

In this embodiment and as shown in FIG. 3, the capture color space is the color space of the input linear RGB values 4:4:4, whereas the encoded color space is the color space of the Y'CbCr value 4:2:0 or 4:2:2 to be encoded.

In an embodiment, the factor that depends on the difference between the capture color space and the encoded color space is preferably determined so that it reduces the QP value for the chroma component more compared to the reference QP value the smaller the capture color space is compared to the encoded color space. This means that the magnitude of the QP offset value is preferably larger the smaller the capture color space is compared to the encoded color space. Thus, the QP value for the chroma component is preferably smaller than the reference QP value, the smaller the capture color space is compared to the encoded color space. This means that the QP offset value is preferably a negative number with a larger magnitude the smaller the capture color space is compared to the encoded color space.

For instance, in a particular embodiment the factor is equal to one if the capture color space is the same as the encoded color space. Furthermore, the factor used if the capture color space is, for instance, ITU-R 709 and the encoded color space is, for instance ITU-R 2020, is larger than if the capture color space is P3D65 and the encoded color space is ITU-R 2020 since the ITU-R 709 is smaller than P3D65 as shown in FIG. 1.

In an embodiment, the reference QP value used to calculate the QP offset value in step S1 and the QP value in step S2 is preferably a QP value of a luma component for the pixel. In such an embodiment, step S1 in FIG. 2 comprises calculating the QP offset value for the chroma component based on a QP value of a luma component for the pixel and the factor that depends on the difference between the capture color space for the pixel and the encoded color space for the pixel. Correspondingly, step S2 comprises calculating the QP value for the chroma component based on the QP value of the luma component reduced by the QP offset value.

The QP value of the luma component as used as reference QP value could be the luma QP value for a block of pixels, the luma QP value for a slice or the luma QP value for a complete picture.

In HEVC, the luma QP value for a block of pixels is not encoded in the bitstream. In clear contrast, a difference, i.e. delta QP value, between a target QP value, i.e. desired QP value, and a predicted QP value is encoded. The predicted QP value is based on luma QP values of neighboring blocks of pixels in the picture. The syntax element for the delta QP value is cu_qp_delta_abs and its sign cu_qp_delta_sign_flag in case it has a non-zero value.

The QP value of the luma component is preferably the value of the parameter $Qp_Y$.

In a particular embodiment, the QP offset value is calculated in step S1 based on the luma QP value for a complete picture and the factor that depends on the difference between the capture color space and the encoded color space. The QP value for the chroma component is then calculated in step S2 based on the luma QP value for the block of pixels reduced by the QP offset value. Thus, in this particular embodiment the QP offset value=f(luma $QP_{picture}$, picture, factor) and chroma QP value=g(luma $QP_{block}$, QP offset value), wherein f(.) and g(.) are different functions. The luma QP value for the block of pixels (luma $QP_{block}$) is in turn determined from the luma QP value for the picture (luma $QP_{picture}$) and slice- and/or block-specific QP delta values for the luma component.

In another particular embodiment, luma QP values are determined for each block of pixels in the picture. The reference QP value used to calculate the QP offset value in step S1 could then be the average of these luma QP values for the blocks of pixels in the picture.

In a particular embodiment, step S1 of FIG. 2 comprises calculating the QP offset value based on the reference QP value, such as $Qp_Y$, and the factor representing a ratio between a maximum magnitude for the chroma component in the encoded color space and a maximum magnitude for the chroma component when it was originally captured in the capture color space.

The result of capturing the video in one color space and encoding the video in another color space is that the maximum Cb and Cr magnitude will be reduced, whereas the maximum luma will be kept unchanged. This means that the amount of QP reduction by the QP offset value for a chroma component is related, in this embodiment, to the ratio between the maximum magnitude for the chroma component in the encoded color space and the maximum magnitude for the same chroma component when it was originally captured in the capture color space. A larger ratio for the chroma component gives a larger reduction in QP value for that chroma component.

The effect on Y'CbCr can be examined by conversion to the XYZ color space. Consider linear RGB values in the capture color space ITU-R 709 that typically gives maximum magnitude for a chroma component: RGBmaxCb709 and RGBmaxCr709. Note that the RGB values will be different for maximum Cb magnitudes and for maximum Cr magnitudes. Where RGBmaxCb709=[0 0 maxLinearValue] and RGBmaxCr709=[maxLinearValue 0 0], e.g. max response on blue respectively red color channel. Then, convert from respectively RGBmaxCb709 and RGBmaxCr709 to XYZmaxCb709 and XYZmaxCr709, respectively, using a matrix multiplication with a RGB709toXYZ color transform, see equation 1 with matrix elements for ITU-R 709.

Now determine what RGB values this corresponds to in the encoded color space, for instance ITU-R 2020, by matrix multiplication of the inverse of the RGB2020toXYZ color transform, i.e. inverse of equation 1 with matrix elements for ITU-R 2020, with XYZ values resulting in RGB2020Cb709 and RGB2020Cb709, respectively.

Then convert to non-linear RGB values given a transfer function applied for the encoded color space, like for example SMPTE ST 2084 [2], which is used for ITU-R 2020, to achieve RGB2020Cb709' and RGB2020Cb709'. Then convert to Y'CbCr, resulting in Y'CbCr2020Cb709' and Y'CbCr 2020Cb709'.

If the video content was captured in the encoded color space the maximum chroma magnitude is 0.5 (in float representation). Due to the capture in one color space and encoding in another color space the maximum Cb magnitude and maximum Cr magnitude will be reduced. The maximum luma will be kept unchanged. To avoid cleaning out chroma coefficients due to the reduced chroma magnitudes the QP values for at least one transform coefficient for Cb and Cr needs to be reduced. The amount of QP reduction for a color component is related to the ratio (factor) between the maximum magnitude for a component in encoded color space (0.5) and the maximum magnitude for the same component when it was originally captured in another color space. A larger ratio for a color component gives a larger reduction in QP value for that component. If the captured and encoded color space is same the ratio will be 1 and this has no effect on reducing QP for the chroma components. Assuming SMPTE ST 2084 transfer function and using ITU-R 2020 as the encoded color space, the ratios for capture in ITU-R 709 will be 0.5/0.126 for Cr and 0.5/0.214 for Cb, and for capture in P3D65 will be 0.5/0.178 for Cr and 0.5/0.214 for Cb.

In an alternative embodiment, the effect on Y'CbCr is performed at a luminance level where color difference is more visible. Instead of as in the embodiment above where the factors depending on the captured and encoded color space is based on the maximum luminance value for a saturated color, the factors depending on the captured and encoded color space are in this embodiment based on a different luminance level than the maximum one, but still for a saturated color. The selected luminance level is preferably a level where the color difference is more visible, or a luminance level that is more common. The selected luminance level could be predetermined as an average over a number of pieces of typical video content. The selected luminance level could also be determined adaptively depending on the luminance characteristics, e.g. average luminance, of the current scene, the current picture or the current block of pixels.

In this embodiment, the maximum magnitudes for Cb and Cr are determined for the encoded color space at a given luminance level. Consider linear RGB values in color space ITU-R 709 that typically gives maximum magnitude for a chroma component for a certain luminance level: RGBmaxCb and RGBmaxCr. Note that the RGB values will be different for maximum Cb magnitudes and for maximum Cr magnitudes. Max Cb magnitude comes from RGBmaxCb=[0 0 blueLinearValue] and max Cr magnitude comes from RGBmaxCr=[redLinearValue 0 0], e.g. max response on blue respectively red color channel. Then convert from corresponding RGB to XYZmaxCb709 and XYZmaxCr709, respectively, using a matrix multiplication with RGB709toXYZ, see equation 1. Now determine what RGB values this corresponds to the encoded color space, for instance ITU-T 2020, RGB2020Cb709, RGB2020Cb709 by conversion using matrix multiplication with the inverse of a matrix RGB2020toXYZ and the RGB values, i.e. inverse of matrix in equation 1. Then convert to non-linear RGB values given a transfer function applied for the encoded color space, like for example SMPTE ST 2084, which is used for ITU-R 2020, resulting in non-linear samples RGB2020Cb709', RGB2020Cb709'. Then convert to Y'CbCr, resulting in Y'CbCr2020Cb709' and Y'CbCr 2020Cb709'.

Determine comparison magnitudes for Cb and Cr by converting the linear RGB values RGBmaxCb and RGBmaxCr to non-linear values using a given transfer function, such as SMPTE ST 2084, resulting in RGB2020Cb' and RGB2020Cr'. Then convert to Y'CbCr, Y'CbCr2020Cb' and Y'CbCr2020Cb'. The magnitude for U in Y'CbCr2020Cb' is the max magnitude for Cb and the magnitude for V in Y'CbCr2020Cr' is the max magnitude for Cr in the encoded color space. Due to the capture in one color space and encoding in another color space the maximum Cb magnitude and maximum Cr magnitude will be reduced. The luma will be kept unchanged. To avoid cleaning out chroma coefficients due to the reduced chroma magnitudes the QP values for at least one transform coefficient of Cb and Cr need to be reduced. The amount of QP reduction for a color component is related to the ratio between the maximum magnitude for a component in encoded color space and the maximum magnitude for the same component when it was originally captured in another color space. A larger ratio for a color component gives a larger reduction in QP for that component. If the captured and encoded color space is same the ratio will be one and this has no effect on reducing QP for the chroma components.

In an alternative embodiment, the effect on Y'CbCr is performed in the non-linear domain, e.g. without any involvement of the transfer function. This will give a more conservative ratio and focus on the effect on small chroma values. Consider non-linear RGB values, R'G'B' with max value for a color channel is 1, in color space ITU-R 709 that typically gives maximum magnitude for a chroma component: RGBmaxCb709' and RGBmaxCr709'. Then convert from RGB to XYZmaxCb709' and XYZmaxCr709', respectively. Now determine what RGB values this corresponds to in the encoded color space, for instance ITU-R 2020, RGB2020Cb709', RGB2020Cb709'. Then convert to Y'CbCr, Y'CbCr2020Cb709' and Y'CbCr 2020Cb709'.

If the content was captured in the encoded color space, the maximum chroma magnitude is 0.5 (in float representation). Due to the capture in one color space and encoding in another color space the maximum Cb magnitude and maximum Cr magnitude will be reduced. The luma will be kept unchanged. To avoid cleaning out chroma coefficients due to the reduced chroma magnitudes the QP values for at least one transform coefficient Cb and Cr need to be reduced. The amount of QP reduction for a color component is related to the ratio between the maximum magnitude for a component in encoded color space (0.5) and the maximum magnitude for the same component when it was originally captured in another color space. A larger ratio for a color component gives a larger reduction in QP for that component. If the captured and encoded color space is same the ratio will be 1 and this has no effect on reducing QP for the chroma components. The ratios for capture in ITU-R 709 will be 0.5/0.28 for Cr and 0.5/0.44 for Cb In the above presented embodiments, the ratio, i.e. factor, is computed based on the maximum magnitudes but it could similarly be computed on the maximum range of chroma component values.

In this embodiment, step S1 of FIG. 2 comprises calculating the QP offset value based on the reference QP value and the factor representing a ratio between a range for the chroma component value in the encoded color space and a range for the chroma component value in the capture color space.

This range is thereby defined as $maxCb_{capture}-minCb_{capture}$ and $maxCr_{capture}-minCr_{capture}$, wherein $maxCb/Cr_{capture}$ represents the maximum Cb/Cr value in the capture color space and $minCb/Cr_{capture}$ represents the minimum Cb/Cr value in the capture color space.

An embodiment for deriving ratios/factors including the range of Cb and Cr values is presented below with pseudo code in Matlab notation. In this embodiment the encoding color space is ITU-R 2020 and the capture color space is ITU-R 709 or P3D65:

```
% Y'CbCr is here denoted YUV, tf is the transfer function SMPTE ST 2084, which is defined for ITU-R
2020
% Matrices for RGB to YUV conversion
% RGB to YUV ITU-R 709
mat709 = [ [ 0.212600, 0.715200,  0.072200 ]; [ −0.114572, −0.385428,  0.500000 ]; [ 0.500000, −0.454153,
−0.045847 ] ];
% RGB to YUV ITU-R 2020
mat2020 = [ [ 0.262700,  0.678000,  0.059300 ]; [ −0.139630,'−0.360370,  0.500000 ]; [ 0.500000, −0.459786,
−0.040214 ] ];
% Matrices for RGB to XYZ conversion
% RGB to XYZ ITU-R 2020
rgb2XYZ2020 = [ [ 0.636958, 0.144617, 0.168881 ]; [ 0.262700, 0.677998, 0.059302 ]; [ 0.000000,
0.028073, 1.060985 ] ];
% RGB to XYZ ITU-R 709
rgb2XYZ709 = [ [ 0.412391,  0.357584,  0.180481 ]; [ 0.212639, 0.715169,  0.072192 ]; [ 0.019331,
0.119195, 0.950532 ] ];
% RGB to XYZ P3D65
rgb2XYZP3D65 = [ [ 0.486571, 0.265668, 0.198217 ]; [ 0.228975, 0.691739, 0.079287 ]; [ 0.000000,
0.045113, 1.043944 ] ];
% Matrices for YUV to RGB conversion
% YUV to RGB ITU-R 2020
yuv2020Torgb = [ [ 1.0000,   0.00000,    1.47460 ]; [ 1.0000,  −0.16455,  −0.57135 ]; [ 1.0000,
1.88140,   0.00000 ] ]
% if fromLinear = 1 it will do XYZ conversions in linear domain and then apply non-linear transfer
function % on derived RGB and finally YUV conversion and if fromLinear = 0 it will do XYZ conversions
in the non-% linear domain omitting the effect of the transfer function
fromLinear = 1;
% encColorCaptureColorSame = 0 assumes that the encoded color space is ITU-R 2020 and the
captured % color space is either ITU-R 709 or P3D65 and encColorCaptureColorSame = 1
corresponds to that both % encoded and capture color space is ITU-R 2020
encColorCaptureColorSame = 0;
% currValueInit = 1 corresponds to max value, if linear it will be scaled to 10000, which is assumed to
be % the max linear value in this example
currValueInit = 1
% if doCb = 1 it do it for Cb otherwise for Cr
doCb = 1;
% if doMax = 1 do it for max value otherwise min value
doMax = 1;
for doCb=0:1
   for encColorCaptureColorSame=0:1
      for doMax = 0:1
      if(fromLinear)
         currValue =currValueInit*10000
      else
         currValue = currValueInit;
      end
      % max value
      if(doMax)
         if(doCb)
            RGB =[0 0 currValue]';
         else
            RGB =[currValue 0 0]';
         end;
      % min value
      else
         if(doCb)
            RGB =[currValue currValue 0]';
         else
            RGB =[0 currValue currValue]';
         end;
      end
      % For capture in ITU-R 709
      xyz709 = rgb2XYZ709*RGB
      if(encColorCaptureColorSame)
      rgb2020from709= RGB
      else
      rgb2020from709= inv(rgb2XYZ2020)*xyz709
      end
      if(fromLinear)
         rgb2020from709(1) = tf(rgb2020from709(1));
         rgb2020from709(2) = tf(rgb2020from709(2));
         rgb2020from709(3) = tf(rgb2020from709(3));
      end
      yuv2020from709 = mat2020*rgb2020from709
```

```
                if(encColorCaptureColorSame)
                    if(doCb)
                        Cb2020(doMax+1) = yuv2020from709(2);
                    else
                        Cr2020(doMax+1) = yuv2020from709(3);
                    end
                else
                    if(doCb)
                        Cb709(doMax+1) = yuv2020from709(2);
                    else
                        Cr709(doMax+1) = yuv2020from709(3);
                    end
                end
                % For capture in P3D65
                xyzP3D65 = rgb2XYZP3D65*RGB
                if(encColorCaptureColorSame)
                    rgb2020fromP3D65= RGB
                else
                    rgb2020fromP3D65= inv(rgb2XYZ2020)*xyzP3D65
                end
                if(fromLinear)
                    rgb2020fromP3D65(1) = tf(rgb2020fromP3D65(1));
                    rgb2020fromP3D65(2) = tf(rgb2020fromP3D65(2));
                    rgb2020fromP3D65(3) = tf(rgb2020fromP3D65(3));
                end
                yuv2020fromP3D65 = mat2020*rgb2020fromP3D65
                if(encColorCaptureColorSame)
                    if(doCb)
                        Cb2020(doMax+1) = yuv2020fromP3D65(2);
                    else
                        Cr2020(doMax+1) = yuv2020fromP3D65(3);
                    end
                else
                    if(doCb)
                        CbP3D65(doMax+1) = yuv2020fromP3D65(2);
                    else
                        CrP3D65(doMax+1) = yuv2020fromP3D65(3);
                    end
                end
            end
        end
    end
end
fprintf('maxCb2020=%f maxCb709=%f maxCbP3D65=%f\n', Cb2020(2),Cb709(2),CbP3D65(2));
fprintf('maxCr2020=%f maxCr709=%f maxCrP3D65=%f\n', Cr2020(2),Cr709(2),CrP3D65(2));
fprintf('minCb2020=%f minCb709=%f minCbP3D65=%f\n', Cb2020(1),Cb709(1),CbP3D65(1));
fprintf('minCr2020=%f minCr709=%f minCrP3D65=%f\n', Cr2020(1),Cr709(1),CrP3D65(1));
% determine factor for Cb and Cr based on ITU-R 2020 range and new range
fprintf('factorCb709=%f       factorCbP3D65=%f\n',        (Cb2020(2)-Cb2020(1))/(Cb709(2)-
Cb709(1)),(Cb2020(2)-Cb2020(1))/(CbP3D65(2)-CbP3D65(1)));
fprintf('factorCr709=%f factorCrP3D65=%f\n', (Cr2020(2)-Cr2020(1))/(Cr709(2)-Cr709(1)),(Cr2020(2)-
Cr2020(1))/(CrP3D65(2)-CrP3D65(1)));
```

As can be seen form the pseudo code above, the factors are computed based on the ratio between the range of Cb or Cr when the capture and encoded color space is same and the range of Cb or Cr when the capture color space is ITU-R 709 or P3D65 and the encoding color space is ITU-R 2020.

If fromLinear is set to 0, i.e. no transfer function is involved, the following max and min values and factors are obtained:

| | | |
|---|---|---|
| maxCb2020 = 0.500000 | maxCb709 = 0.437655 | maxCbP3D65 = 0.480665 |
| maxCr2020 = 0.500000 | maxCr709 = 0.281273 | maxCrP3D65 = 0.355932 |
| minCb2020 = −0.500000 | minCb709 = −0.437655 | minCbP3D65 = −0.480666 |
| minCr2020 = −0.500000 | minCr709 = −0.281273 | minCrP3D65 = −0.355933 |
| factorCb709 = 1.142451 | factorCbP3D65 = 1.040224 | |
| factorCr709 = 1.777633 | factorCrP3D65 = 1.404760 | |

If fromLinear is set to 1, i.e. including transfer function, and currValue is at maximum linear value, the following max and min values and factors are obtained:

| | | |
|---|---|---|
| maxCb2020 = 0.500000 | maxCb709 = 0.214172 | maxCbP3D65 = 0.214250 |
| maxCr2020 = 0.500000 | maxCr709 = 0.125750 | maxCrP3D65 = 0.178455 |
| minCb2020 = −0.500000 | minCb709 = −0.120658 | minCbP3D65 = −0.219589 |
| minCr2020 = −0.500000 | minCr709 = −0.049020 | minCrP3D65 = −0.072733 |
| factorCb709 = 2.986586 | factorCbP3D65 = 2.305002 | |
| factorCr709 = 5.721823 | factorCrP3D65 = 3.981087 | |

If fromLinear is set to 1, i.e. including transfer function, and currValue is at 100, the following max and min values and factors are obtained:

| | | |
|---|---|---|
| maxCb2020 = 0.254039 | maxCb709 = 0.158903 | maxCbP3D65 = 0.160882 |
| maxCr2020 = 0.254039 | maxCr709 = 0.099174 | maxCrP3D65 = 0.128911 |
| minCb2020 = −0.254039 | minCb709 = −0.101452 | minCbP3D65 = −0.164594 |
| minCr2020 = −0.254039 | minCr709 = −0.044327 | minCrP3D65 = −0.064298 |
| factorCb709 = 1.951476 | factorCbP3D65 = 1.561030 | |
| factorCr709 = 3.540566 | factorCrP3D65 = 2.629684 | |

If fromLinear is set to 1, i.e. including transfer function, and currValue is at 1, the following max and min values and factors are obtained:

| | | |
|---|---|---|
| maxCb2020 = 0.074973 | maxCb709 = 0.057911 | maxCbP3D65 = 0.059612 |
| maxCr2020 = 0.074973 | maxCr709 = 0.038180 | maxCrP3D65 = 0.047637 |
| minCb2020 = −0.074973 | minCb709 = −0.042709 | minCbP3D65 = −0.060692 |
| minCr2020 = −0.074973 | minCr709 = −0.020600 | minCrP3D65 = −0.028935 |
| factorCb709 = 1.490208 | factorCbP3D65 = 1.246389 | |
| factorCr709 = 2.550974 | factorCrP3D65 = 1.958219 | |

From above it can be seen that the level of luminance has an impact on the value of factors. The factor is larger for higher luminance levels than for low luminance levels. In a particular embodiment, it might be more correct to use factors based on lower luminance levels than the highest luminance level.

In an embodiment, step S1 in FIG. 2 comprises calculating the QP offset value based on equation 4:

$$\max(-12, \text{round}(fx(k \times \text{refQP} + m))) \qquad \text{equation 4}$$

In equation 4, f denotes the factor, k is a chroma scaling factor, typically negative chroma scaling factor, m is a chroma offset, refQP denotes the reference QP value, max(a, b) is equal to a if a>b and otherwise equal to b and round(a) rounds a to the nearest integer.

In an embodiment, the QP value for at least one transform coefficient of a chroma component is reduced by a QP offset value relative to a reference QP value based on a factor that depends on the difference between the capture color space and the encoded color space. The following equations could be used to calculate the chroma QP offset values, Cb_QP_offset and Cr_QP_offset:

$$Cb\_QP\_offset = \max(-12, \text{round}(c\_cb \times (k \times \text{refQP} + m)))$$

$$Cr\_QP\_offset = \max(-12, \text{round}(c\_cr \times (k \times \text{refQP} + m)))$$

wherein k is a chroma scaling factor, m is a chroma offset, c_cb and c_cr are factors for each of Cb and Cr depending on the difference between the capture color space and the encoded color space (corresponds to fin equation 4).

In another embodiment, the following equations could be used to calculate the chroma QP offset values:

$$Cb\_QP\_offset = \text{Clip3}(-12, 12, \text{round}(c\_cb \times (k \times \text{refQP} + m)))$$

$$Cr\_QP\_offset = \text{Clip3}(-12, 12, \text{round}(c\_cr \times (k \times \text{refQP} + m)))$$

Thus, in this embodiment, the QP offset value is defined to be within the interval [−12, 12]. The value −12 or the values −12, 12 in the two embodiments above for calculating QP offset values may be replaced by some other values and are thereby not necessarily limited to these example values.

In further embodiment, the chroma QP offset values are calculated as:

$$Cb\_QP\_offset = \min(0, \text{round}(c\_cb \times (k \times \text{refQP} + m)))$$

$$Cr\_QP\_offset = \min(0, \text{round}(c\_cr \times (k \times \text{refQP} + m)))$$

wherein min(a, b) is equal to a if a<b and otherwise equal to b.

In yet another embodiment, the chroma QP offset values are calculates as:

$$Cb\_QP\_offset = \text{Clip3}(-12, 12, \min(0, \text{round}(c\_cb \times (k \times \text{refQP} + m))))$$

$$Cr\_QP\_offset = \text{Clip3}(-12, 12, \min(0, \text{round}(c\_cr \times (k \times \text{refQP} + m))))$$

In an embodiment, c_cb=1 if the capture color space is same as representation color space, i.e. the encoded color space, c_cb=1.04 if the capture color space is P3D65 and representation color space, i.e. the encoded color space, is ITU-R 2020, c_cb=1.14 if capture color space is ITU-R 709 and representation space, i.e. encoded color space, is ITU-R 2020. Likewise, c_cr=1 if the capture color space is same as representation color space, i.e. the encoded color space, c_cr=1.39 if the capture color space is P3D65 and representation color space, i.e. the encoded color space, is ITU-R 2020, c_cr=1.777≈1.78 or c_cr=1.79 if the capture color space is ITU-R 709 and representation space, i.e. the encoded color space, is ITU-R 2020.

In an embodiment, the chroma scaling factor k is −0.46 and the chroma offset m is 9.26.

These factors can then be used to control the QP offset values for Cb and Cr, respectively, as shown in the embodiment above where the corresponding notation is c_cb and c_cr for a scaling factor for Cb and Cr, respectively.

In an embodiment, the quality for chroma is given more importance, i.e. the QP value for the chroma is reduced when a criterion, based at least on the reference QP and a factor that depends on the difference between the capture color space and the encoded color space, is fulfilled. In an embodiment, the criterion is based on at least one syntax element of a video coding bitstream. One example of the syntax element is the quantization parameter for luma ($Qp_Y$) and the QP for luma is the reference QP.

One example of importance is given by having a lower quantization parameter for chroma than for luma. For instance, assume that in configuration A, the luma QP is 10 and in configuration B, the luma QP is 30. Having a chroma QP value of 13 (chroma QP offset 3) may give sufficiently good color quality in configuration A, while in configuration B a chroma QP of 27 (chroma QP offset −3) may be necessary to remove the worst color artifacts. One reason for reducing the chroma QP when the QP is relatively high is that blocking artifacts for chroma can become visible otherwise. Another reason for reducing the chroma below QP 30 is that the actual chroma QP is inherently reduced for QP values larger than 30 in HEVC (also in H.264 but not same mapping), see Table 1, to avoid removing all chroma transform coefficients. For coding of HDR sequences, QP values below 30 also can benefit from a lower QP for chroma than is used for luma. The reduction of the QP for a chroma component can be achieved by a negative QP offset, such as slice_cb_qp_offset and slice_cr_qp_offset in HEVC and chroma_qp_index_offset and second_chroma_qp_index_offset in H.264, for that chroma component.

Thus, in an embodiment steps S1 and S2 in FIG. 2 are conditioned on a criterion. In such an embodiment, steps S1 and S2 are performed if the QP value for the luma component for the pixel is larger than a threshold value, such as 30. This means that in this embodiment, the QP offset value for the chroma component is only calculated based on the reference QP value and the factor that depends on the difference between the capture color space and the encoded color space if the luma QP value is larger than the threshold, such as 30.

However, as mentioned above also QP values below 30 may benefit from a lower QP value for chroma components. Hence, this conditional calculation of the QP offset value is optional.

Another aspect of the embodiments relates to a method of calculating a quantization parameter, QP, value for a chroma component Cb and/or Cr of a pixel in a picture comprising a plurality of pixels in a video sequence comprising a plurality of pictures. The method comprises, see FIG. 2, calculating, in step S1, a QP offset value for the chroma component Cb and/or Cr based on max(−12, round(c_cb× k×refQP+m))) and/or max(−12, round(c_cr×(k×refQP+ m))). The parameter k is a chroma scaling factor, m is a chroma offset, refQP is a reference QP value. c_cb=1 and c_cr=1 if a capture color space for the pixel is same as an encoded color space for the pixel, c_cb=1.04 and c_cr=1.39 if the capture color space is P3D65 and the encoded color space is ITU-R 2020, c_cb=1.14 and c_cr=1.78 or 1.79 if the capture color space is ITU-R 709 and the encoded color space is ITU-R 2020, max(a, b) is equal to a if a>b and otherwise equal to b, round(a) rounds a to the nearest integer. The method also comprises calculating, in step S2, the QP value for the chroma component Cb and/or Cr based the reference QP value reduced by the QP offset value.

In another embodiment, step S1 comprises calculating the QP offset value for the chroma component Cb and/or Cr based on min(0, round(c_cb×(k×refQP+m))) and/or min(0, round(c_cr×(k×refQP+m))).

In a further embodiment, step S1 comprises calculating the QP offset value for the chroma component Cb and/or Cr based on Clip3(−12, 12, min(0, round(c_cb×(k×refQP+ m)))) and/or Clip3(−12, 12, min(0, round(c_cr×(k×refQP+ m)))).

In a general embodiment, step S1 comprises calculating the QP offset value for the chroma component based on round(f×(k×refQP+m)), wherein f denotes the factor that depends on the difference between the capture and encoded color space for the pixel.

The parameters k, m, refQ and the functions max(.), min(.), Clip3(.) and round(.) are as defined above.

In the above aspects of the embodiments, the parameter k is preferably −0.46 and the parameter m is preferably 9.26.

In the above described embodiments, the factors c_cb and c_cr are calculated based on the difference between the capture and encoded color space. This is, however, equivalent to calculate the factors C_cb, M_cb and C_cr, M_cr based on the difference between the capture and encoded color space. In this case, C_cb=c_cb×k, M_cb=c_cb×m and C_cr=c_cr×k, M_cr=c_cr×m. The above described equations for the QP offset values could then be rewritten as:

max(−12,round($C\_cb$×refQP+$M\_cb$))

max(−12,round($C\_cr$×refQP+$M\_cr$))

or min(0,round($C\_cb$×refQP+$M\_cb$))

min(0,round($C\_cb$×refQP+$M\_cb$))

or

Clip3(−12,12,min(0,round($C\_cb$×refQP+$M\_cb$)))

Clip3(−12,12,min(0,round($C\_cb$×refQP+$M\_cb$)))

Figure 4:
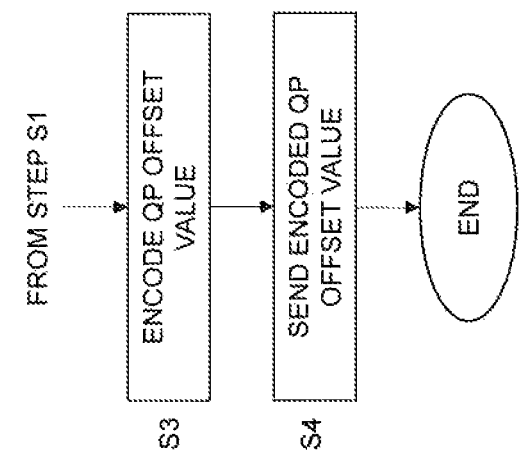
FIG. 4 is a flow chart illustrating additional, optional steps of the method shown in FIG. 2 according to an embodiment.

FIG. 4 is a flow chart illustrating additional, optional steps of the method shown in FIG. 2. The method continues from step S2 in FIG. 2 to step S3 in FIG. 4, which comprises encoding the QP offset value. A next step S4 comprises sending the encoded QP offset value to a decoder.

Thus, in this embodiment the QP offset value calculated in step S1 is encoded and transmitted to the decoder, typically in the bitstream representing an encoded version of the video sequence. There the decoder can parse or retrieve and decode the encoded QP offset value, and then use the obtained QP offset value to calculate a QP value for the chroma component. This calculation of the QP value at the decoder is preferably done as described in the foregoing in connection with step S2 in FIG. 2, i.e. calculating the QP value for the chroma component based on the reference QP value reduced by the QP offset value.

Thus, the method steps shown in FIGS. 2 to 4 are preferably performed at an encoder and during encoding of a video sequence. The QP offset values as calculated according to the embodiments are, however, preferably encoded and transmitted to the decoder to be used during decoding of the encoded video sequence (bitstream).

The encoded QP offset value is typically included in the bitstream, i.e. encoded video sequence, such as in the PPS, slice header and/or encoded data for a block of pixels.

Figure 5:
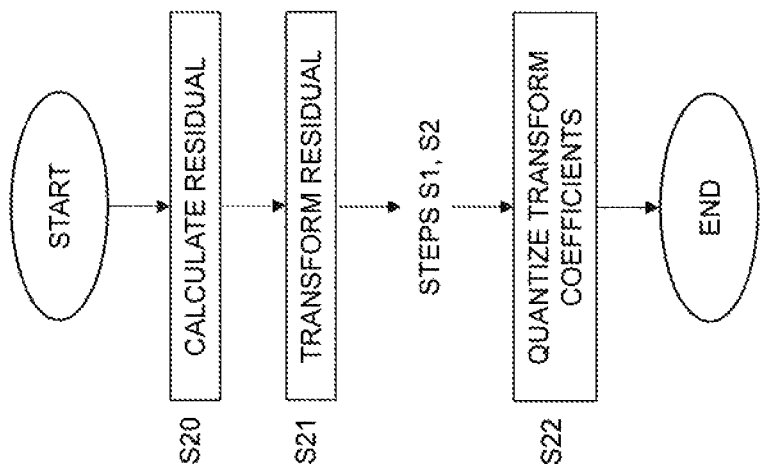
FIG. 5 is a flow chart illustrating a method for encoding a video sequence according to an embodiment.

FIG. 5 is a flow chart illustrating a method for encoding a video sequence comprising a plurality of pictures. Each picture comprises a plurality of pixels and each pixel is associated with a luma component value and two sub-sampled chroma component values. The method comprises calculating, in step S20 for a pixel in a picture of the video sequence, a residual based on a difference between a sub-sampled chroma component value and a predicted chroma component value. A next step S21 comprises transforming the residual into a frequency domain to obtain transform coefficients. A QP value for the chroma component is then calculated as previously described herein in connection with steps S1 and S2 in FIG. 2. The transform coefficients are then quantized in step S22 and wherein a level of quantization is determined by the QP value.

Thus, step S22 comprises quantizing the transform coefficients based on or using the QP value calculated as shown in FIG. 2.

Each pixel in the picture has a respective luma component value since the luma components are represented in full resolution. However, chroma components are subsampled. Accordingly, a subsampled chroma component value is thereby associated with and assigned to multiple neighboring pixels in the picture, such as 2×2 pixel or 1×2 pixels or 2×1 pixels depending on the subsampling, i.e. Y'CbCr 4:2:0 or Y'CbCr 4:2:2. When the subsampled chroma component values are upsampled to Y'CbCr 4:4:4 this means that the multiple neighboring pixels will be assigned the same upsampled chroma component value. The multiple neighboring pixels, however, have respective luma component values. A pixel associated with a luma or chroma component value thereby encompasses that the pixel is assigned a luma component value, is assigned a chroma component value, or "shares" a subsampled chroma component value with neighboring pixels in the picture.

In encoding of a video sequence, the luma and chroma components are encoded independently. Accordingly, the encoding steps S20 to S22 shown in FIG. 5 can performed for the chroma component Cb, for the chroma component Cr or for both chroma components Cb, Cr.

Generally, a block of pixels is encoded by calculating a residual between the subsampled chroma component values of the block of pixels and the chroma component values of a prediction block of pixels, generally denoted predicted chroma component values. The predicted chroma component values can be obtained either with intra prediction or inter prediction, which is well known in the art. The difference between the chroma component values and the predicted chroma component values is denoted the residual for the block of pixels. This residual as calculated in step S20 is then transformed into the frequency domain to obtain transform coefficients. These transform coefficients are then quantized using a QP value calculated for the block of pixels in steps S1 and S2 to obtain quantized transform coefficients in step S22. The quantized transform coefficients are then input to the encoder, preferably an entropy encoder, such as a context-adaptive binary arithmetic coding (CABAC) encoder, to encode the quantized transform coefficients.

FIG. 6 is a flow chart illustrating a method for decoding an encoded video sequence comprising a plurality of pictures. Each picture comprises a plurality of pixels and each pixel is associated with a luma component value and two subsampled chroma component values. The method comprises decoding, in step S30, the encoded video sequence to obtain quantized transform coefficients and a QP offset value for a chroma component of a pixel. The QP offset value depends on a reference QP value and a factor that depends on a difference between a capture color space for the pixel and an encoded color space for the pixel. The method continues to step S31, which comprises dequantizing the quantized transform coefficients using a QP value calculated based on the reference QP value reduced by the QP offset value to obtain transform coefficients. A following step S32 comprises inverse transforming the transform coefficients to obtain a residual. A reconstructed subsampled chroma component value is then calculated in step S43 based on the residual and the predicted chroma component value.

The decoding as shown in FIG. 6 is substantially the inverse of the encoding as shown in FIG. 5. The QP offset value used to calculate the QP value for the chroma component and dequantize the quantized transform coefficients in step S31 is preferably obtained from the encoded video sequence and calculated at the encoder side as previously described herein in connection with step S1 in FIG. 2. This means that the decoder can use the QP offset value retrieved from the encoded video bit sequence, such as from a PPS, a slice header or the encoded data for a block of pixels, and calculate the QP value for the chroma component based on the QP offset value and the reference QP value, such as the QP value for the luma component of the pixel.

In the art of video coding, typically more bits are spent on luma than on chroma since human perception is more sensitive to luminance. Chroma is typically represented in smaller resolution than the luma since the human perception is not as sensitive to chroma. Having the same QP value or lambda for chroma and luma can lead to visual color artifacts. These color artifacts tend to be more visible for HDR video than for SDR video. Having a lower QP for chroma than for luma can result in increased bitrate without visually improved color quality.

In an embodiment, a method for encoding a video sequence is provided. The video sequence comprises a plurality of pictures, wherein each picture comprises a plurality of samples, also denoted pixels, and each sample/pixel is associated with chroma and luma values. A difference between an original pixel/sample data and a predicted pixel/sample data, referred to as the residual, is transformed into the frequency domain by transform coefficients and quantized before transmitted together with necessary prediction parameters, such as mode selections and motion vectors. The level of quantization is determined by a QP.

Each picture or a part of the picture is associated with QP for the chroma components and QP for luma components. The method is illustrated in FIG. 7 and comprises reducing the QP for at least one transform coefficient of one chroma component compared to a reference QP, e.g. $Qp_Y$+pps_cb_qp_offset and $Qp_Y$+pps_cr_qp_offset, when a criterion, based on at least the reference QP and a factor that depends on the difference between the capture color space and the encoded color space, is fulfilled. The method also comprises encoding the difference between the reduced QP and the reference QP, i.e. the QP offset value. The method further comprises sending the encoded difference to a decoder.

In another embodiment, the method illustrated in FIG. 7 comprises reducing the QP, i.e. the color component QP, for at least one transform coefficient of one chroma component compared to a reference QP, e.g. $Qp_Y$+pps_cb_qp_offset and $Qp_Y$+pps_cr_qp_offset, by an offset, the offset being based on e.g. at least the reference QP and a factor that depends on the difference between the capture color space and the encoded color space. For instance, the QP for the chroma component could be reduced by a different offset if the capture color space is ITU-R 709 and the encoded color space is ITU-R 2020 compared to if the capture color space is P3D65 and the encoded color space is ITU-R 2020. The method also comprises encoding the difference between the reduced QP and the reference QP, i.e. the QP offset value. The method further comprises sending the encoded difference to a decoder.

In the embodiments above, $Qp_Y$ represents the reference QP value and QP offset value is represented by the parameter pps_cb_qp_offset or pps_cr_qp_offset, which has a negative value.

An embodiment of this method is illustrated in FIG. 8, which captures that we scale a function based on the reference QP. Another embodiment is illustrated in FIG. 9, which captures that the factor is dependent on the luminance.

The embodiment illustrated in FIG. 8 comprises determining RGB values that maximize respectively minimize the value of a chroma component. The method also comprises determining a factor based on the ratio between the range of values when encoding and capture color space is same and the range of values for the current capture color space and the encoding color space. The factor is used to scale a function that depends on the reference QP to determine a reduced QP for at least one transform coefficient when the current capture color space is smaller than the encoding color space. The method also comprises encoding the difference between the reduced QP and the reference QP, i.e. the QP offset value. The method further comprises sending the encoded difference to a decoder.

The embodiment illustrated in FIG. 9 comprises determining RGB values that maximize respectively minimize the value of a chroma component given a luminance. For the given luminance, a factor is determined based on the ratio between the range of values when encoding and capture color space is same and the range of values for current capture color space and encoding color space. The factor is used to reduce a reference QP for at least one transform coefficient when the current capture color space is smaller than the encoding color space. The method also comprises encoding the difference between the reduced QP and the reference QP, i.e. the QP offset value. The method further comprises sending the encoded difference to a decoder.

According to an embodiment, the reference QP is the luma QP.

According to an embodiment, the criterion is retrieved from a syntax element such as the QP for luma. Another example is the slice QP offset if it has been applied on the luma QP.

According to a further embodiment, a chroma component QP is adjusted by setting the chroma component QP offset for a picture or slice based on the difference between the capture color space and the encoded color space.

According to a further embodiment, the chroma QP is adjusted by setting a block based chroma QP offset.

In an embodiment, the QP for a color component is assigned according to an approximate model using a reference QP and a factor that depends on a difference between the capture and encoded color space. Where the factor reduces the color component QP more compared to the reference QP the smaller the capture color space is compared to the encoded color space.

According to an embodiment, the factor is determined by comparing the magnitude of a color sample as obtained in a capture color space after its conversion to a common color space and then conversion to the encoded color space with corresponding color sample if it was obtained directly in the encoded color space.

According to an embodiment, the magnitude of a color sample is obtained on Cb or Cr component after conversion from RGB to Y'CbCr.

According to an embodiment, the conversion between color spaces is performed on linear samples and converted using a transfer function to non-linear samples.

According to an embodiment the QP modification of a chroma component is determined by max(−12, round(f* (k*refQP+m)), where f is the factor that depends on the difference between the capture and the encoded color space, k is a negative constant and m is constant.

Implementation Example

This implementation example suggests how to set Cb and Cr QP offset for coding HDR and WCG for a given luma QP, capture color space and representation color space in order to assess performance of new tools aimed at improved color quality in HDR coding.

The magnitudes of chroma components (UV) are inherently 50% weaker than the luma magnitudes. To avoid removing chroma completely for higher Quantization Parameters (QPs) previous standards such as H.264 and HEVC have used a lower QP value for chroma than for luma for Y'UV 4:2:0 color format. In HEVC QPs above 30 will result in a chroma QP inherently below the luma QP unless chroma QP offsets are signaled. By applying negative chroma offsets in coding of HDR video, significant improvements in color quality can be achieved. In this implementation example, a formula for assigning specific Cb QP offset and Cr QP offset based on the luma QP is provided. The reason for individual QP offsets for Cb and Cr is that there are different reductions in maximum magnitude for the chroma components when the capture color space is a subset of the representation color space.

The effect on Y'UV components when video is captured in one color space and represented in another color space can be examined by conversion via XYZ color space. If a color is captured in one color space, for example ITU-R 709, and then represent it in ITU-R 2020 the maximum luminance magnitude is preserved. However, the maximum chrominance magnitudes will be reduced. The maximum Cr magnitude is reduced from 0.5 (given in float representation) to 0.28 and the maximum Cb magnitude is reduced from 0.5 to 0.44. If we capture in P3D65 and represented in ITU-R 2020 the maximum luminance magnitude is again preserved and the maximum Cr magnitude is reduced from 0.5 to 0.36 and the maximum Cb magnitude is reduced from 0.5 to 0.48.

Thus, a larger negative chroma offsets is needed to omit cleaning out chroma coefficients when the capture color space is smaller than the representation color space. The impact of the capture color space being a subset of the representation space is larger for Cr than Cb resulting in more negative offsets for the Cr component than for the Cb component.

If the captured color space is same as the representation color space there is no modification of the maximum magnitudes.

Based on informal viewing of the CfE test sequences with different chroma QP offsets we have derived approximative models that assigns Cb and Cr QP offset based on the sequence QP, capture color space and representation color space.

$$Cb=\max(-12,\mathrm{round}(c\_cb^*(-k^*QP+m)))$$

$$Cr=\max(-12,\mathrm{round}(c\_cr^*(-k^*QP+m)))$$

Where c_cb=1 if capture color space is same as representation color space, c_cb=1.04 if capture color space is P3D65 and representation color space is ITU-R 2020, c_cb=1.14 if capture color space is ITU-R 709 and representation space is ITU-R 2020.

Where c_cr=1 if capture color space is same as representation color space, c_cr=1.39 if capture color space is P3D65 and representation color space is ITU-R 2020, c_cr=1.78 or 1.79, such as 1.78, if capture color space is ITU-R 709 and representation space is ITU-R 2020.

HM has been modified to derive Cb and Cr QP offsets pending on the sequence QP, capture source color space and representation color space and set the PPS Cb and Cr QP offsets correspondingly.

We have verified that the visual quality is better or similar, at same or lower bitrate, when deploying the approximative chroma QP offset assignment model on both the CfE anchor and HDRtools0.10 with ClosedLoopConversion=5 and FilterInFloats=1. It can be noted that the chroma QP assignment model fails to improve the visual quality of the CfE anchor in areas of source luminance problems.

It can be noted that applying the approximative chroma QP offset assignment significantly improves the deltaE performance of the Anchor and Anchor with ClosedLoopConversion set to 5 with an average BD rate of −31% respectively −32%. According to our own evaluations, applying these QP offset also makes the visual quality clearly better for low bitrates. We would like to highlight that chroma QP offset is a tool that is present in all profiles of HEVC and therefor already supported in all HEVC decoders. We suggest that the approximative model for applying chroma QP offset should be considered when evaluating new tools and technology aimed at improving the color coding of HDR video.

Lambda is used in rate distortion optimization (RDO) to determine the best coding parameters considering both the amount of bits needed for coding the parameter and the distortion that is a result of using the coding parameter. The cost function in HEVC looks like this:

lambda*bits+distortion where the distortion typically is the sum of squared errors for all samples that are generated by the coding parameter, typically a block of pixels, or the sum of absolute values of respective error. Lambda is typically used as a function of QP.

According to a further embodiment, a smaller lambda parameter in rate distortion optimization is used for chroma than for luma.

A smaller lambda parameter, e.g. being a function of QP, in rate distortion optimization for chroma than for luma can also be used. This can be done instead of reducing the chroma QP or in combination with chroma QP reduction. This can for example be used for QPs below 30 for coding of HDR video.

Figure 10:
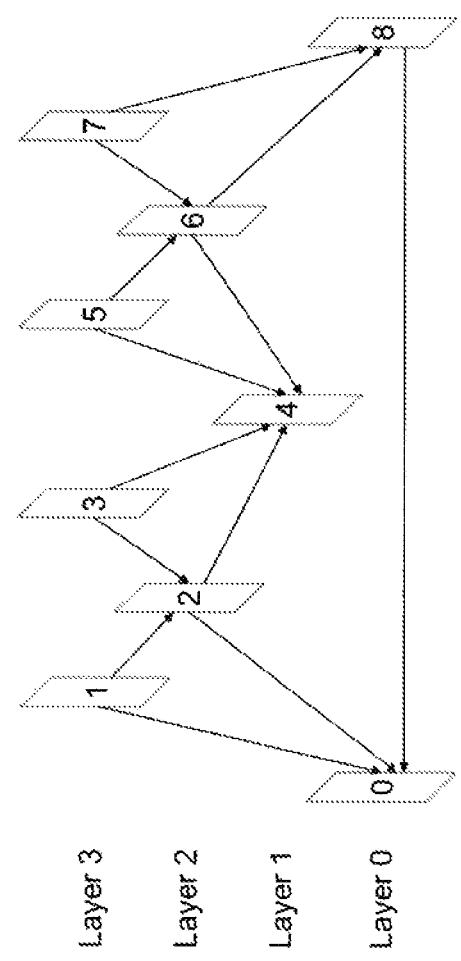
FIG. 10 illustrates an example of four layer hierarchical GOP structure for a video sequence using two reference pictures per picture.

Typically video is encoded with reference to previous coded pictures in some order. In random access configuration, independently coded pictures (IRAP) (picture 0) are positioned with a fixed interval like every second, see FIG. 10. Pictures between the IRAPs are typically coded with a GOP structure where one typically predict and code a picture (picture 8) eight pictures ahead of display time and then use that picture and previously coded pictures to predict and code a picture (picture 4) four pictures ahead of display time. Then similarly predict and code pictures (picture 2) two pictures and (picture 6) six pictures ahead of display time. Then similarly predict and code pictures (picture 1, picture 3, picture 5 and picture 7) one, three, five and seven pictures ahead of display time. The pictures 1, 3, 5 and 7 are referred to be on the highest hierarchical level (layer 3), the pictures 2, 4 and 6 to be on the next highest hierarchical level (layer 2), and the picture 4 to be on next lowest level (layer 1) and pictures 0, 8 to be on the lowest level (layer 0). Typically the pictures 1, 3, 5 and 7 are not used for prediction of any other pictures, so called non-reference pictures. Non-reference pictures can be removed without destroying the decoding capability of a bitstream. An example of a GOP structure is illustrated in FIG. 10. The structure is repeated until the next IRAP picture. Typically a higher QP is set for a picture higher up in the GOP hierarchy so that the pictures 1, 3, 5 and 7 have the highest QP.

Figure 11:
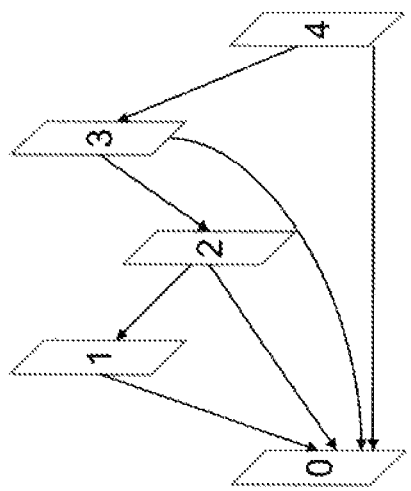
FIG. 11 illustrates an example of three layer low-delay configuration for a video sequence using two reference pictures per picture with prediction only from previous pictures in presentation order.

In low delay configuration the first picture is an independently coded picture (IRAP) (picture 0) and the following pictures are typically dependently coded based on previously coded pictures, see FIG. 11. Typically every fourth picture (picture 4) has a lower QP than the QP of the pictures in between (pictures 1, 2, 3). Typically the neighboring pictures (picture 2) to the every fourth picture have lower QP than the last picture (picture 1, 3) in this hierarchy similar as the GOP but here the prediction is typically never from a future picture. Every fourth picture with lowest QP is referred to be on the lowest hierarchical level (layer 0), the neighboring pictures to that on the next higher hierarchical level (layer 1) and the last type of picture to be on the highest hierarchical level (layer 2). An example of a low-delay configuration is depicted in FIG. 11.

According to a further embodiment, the chroma QP is reduced from the reference QP by setting a chroma QP offset for a picture or slice based on the hierarchical level. The hierarchical level is defined by the QP used for luma for that picture compared to the QP used for an independently decodable picture (IRAP). The reduction can also consider any inherent reduction of chroma QP compared to luma QP that may exist for the specific reference QP.

In this embodiment, the chroma QP for a slice or a picture is set according to the hierarchical level, where the hierarchical level is defined by the QP used for luma for that picture compared to the QP used for an independently decodable picture (IRAP). A larger difference between the luma QP of the current picture compared to the luma QP for the IRAP correspond to a higher hierarchical level. One example is to decrease the chroma QP with increasing hierarchical level. Another example is to increase the chroma QP with increasing hierarchical level, e.g. defined by a QP used for luma. In this embodiment, the chroma QP is reduced compared to a reference QP depending on the hierarchical level, which may be defined by the luma QP.

This embodiment thereby relates to a method of calculating a QP value for a chroma component of a pixel in a picture comprising a plurality of pixels in a video sequence comprising a plurality of pictures. The method comprises calculating a QP offset value for the chroma component based on a hierarchical level for a picture in the video sequence. The method also comprises calculating the QP value for the chroma component based on a reference QP value and the QP offset value.

In an embodiment, calculating the QP offset value comprises calculating the QP offset value for the chroma component based on a luma QP value for the picture and on a luma QP value for an independently decodable picture, IRAP, in the video sequence.

In an embodiment, calculating the QP value comprises calculating the QP value for the chroma component based on the luma QP value for the picture reduced by the QP offset value.

In another embodiment, calculating the QP value comprises calculating the QP value for the chroma component based on the luma QP value for the picture increased by the QP offset value.

In an embodiment, calculating the QP offset value comprises calculating the QP offset value for the chroma component based on a polynomial model. Parameters of the polynomial model could, for example, be derived to counteract an inherent reduction of chroma QP values for increasing luma QP values.

Hence, in this embodiment, the QP offset value allows for an increase in the QP value for the chroma components, such on slice or picture level.

In HEVC and H.264, a reference QP is indicated in PPS. This reference QP can be adjusted by a QP offset in the slice header. During coding of pictures it is beneficial to vary the QP, so called QP toggling, to improve the coding efficiency. This is done by signaling a slice QP offset in the slice header. QP toggling is usually performed hierarchically. This is shown for two different configurations in FIG. 10 with random access and FIG. 11 with low delay. A problem with QP toggling is that the chroma quality is reduced significantly for HDR. In addition, blocking artifacts can occur, which in HDR case can be related to the QP toggling.

So when the reference QP for a picture or slice is increased, e.g. the criterion is fulfilled, the chroma QP, which is derived from the reference QP, is reduced by applying a negative picture or slice specific offset so that the increase of the reference QP does not give same increase of the chroma QP as for the luma QP. This can improve the chroma quality without so large effect of the total bitrate. Since there is a "default" reduction of chroma QP for QPs higher than 30 in HEVC, see Table 1, the modification of the chroma QP above QP 30 should consider this to avoid reducing the chroma QP too much.

Example code in TEncSlice.cpp (HM reference software) where chroma is encoded with a finer quantization than luma by the use of slice chroma QP offsets that are encoded when the slice chroma QP flag is set to one:

```
if(eSliceType!=I_SLICE)
{
  Int theOffset = -2;
  if(m_pcCfg->getGOPSize( )==4)
  {
    switch(m_pcCfg->getGOPEntry(iGOPid).m_QPOffset)
    {
      // QP offset according to HM
      case 3: theOffset = -5; break;
      case 2: theOffset = -4; break;
      case 1: theOffset = -3; break;
      default: theOffset = -2; break;
    }
  }
  if(m_pcCfg->getGOPSize( )==8)
  {
    switch(m_pcCfg->getGOPEntry(iGOPid).m_QPOffset)
    {
      // QP offset according to HM
      case 4: theOffset = -6; break;
      case 3: theOffset = -5; break;
      case 2: theOffset = -4; break;
      case 1: theOffset = -3; break;
      default: theOffset = -2; break;
    }
  }
  rpcSlice->setSliceChromaQpDelta( COMPONENT_Cb, theOffset );
  rpcSlice->setSliceChromaQpDelta( COMPONENT_Cr, theOffset );
}
else
{
  rpcSlice->setSliceChromaQpDelta( COMPONENT_Cb, -2 );
  rpcSlice->setSliceChromaQpDelta( COMPONENT_Cr, -2 );
}
rpcSlice->getPPS( )->setSliceChromaQpFlag(true);
```

Above it can be seen that a chroma QP offset is set pending on the QP offset (m_QPOffset) that is defined for respective GOP entry, i.e. hierarchical level. The result of this is that chroma will be quantized with two quantizations steps finer than used for luma quantization for intra slices (I_SLICE) and for respectively hierarchical level. Alternatively, the chroma can have finest quantization, for example SliceChromaQpDelta of −6, for the intra slices and coarser quantization for chroma for each hierarchical level, e.g. SliceChromaQpDelta of −5, −4, −3, −2 etc.

The above change of chroma QP offset can be defined as additional parameters, such as QPchromaOffset, inbetween QPfactor and QPoffset in the encoder configuration file for the HEVC reference software (HM). Here with the approach of using finer chroma quantization for higher hierarchical level (higher QPoffset):
Type POC QPoffset QPchromaOffset QPfactor tcOffsetDiv2 betaOffsetDiv2 temporal_id # ref_pics_active # ref_pics reference pictures predict deltaRPS # ref_idcs reference idcs The QPchromaOffset is then used in TEncSlice.cpp to set slice_cb_qp_offset and slice_cr_qp_offset.

An example to consider the default mapping between the reference QP and chroma QP as in Table 1 when determining the modification of the chroma QP:

Assume the reference QP is 36 and the desired chroma QP reduction is −6. Then determine the difference between the mapped QP according to Table 1 and the reference QP. This gives 34−36=−2. Then the slice QP offset should be set to −6−(−2)=−4. Then the actual chroma QP is obtained be checking the table using for QP 36−4=32, which then is mapped to 31. Since this corresponds to a reduction of 5 the slice QP offset is set to one unit smaller e.q. −5. Then the table can be checked with QP 36−5=31 and this is mapped to QP 30. Now we have found that slice QP offset equal to −5 gives the desired reduction −6 of the chroma QP. This approach can also be used for H.264 but using the specific mapping defined in H.264.

HEVC similar as other video codecs includes an in-loop deblocking filter on reconstructed samples intended to reduce the blocking artifacts due to block-based coding. The deblocking filter is applied both for luma and chroma components but only on the samples located at block boundaries. The filter strength is determined based on the relation of the block types on each side of the boundary, whether any of the blocks have transform coefficients and/or the difference in motion vectors and reference indices. From the filter strength and the average QP two values tC and beta are determined. Offsets to tC and beta may be signaled at picture level. When QP is high the filter strength is stronger thus removing sample variations more than when the QP is low.

In another embodiment the chroma QP can be reduced if a criterion based on a deblocking metric is fulfilled to avoid appearance of blocking artifacts. The deblocking metric is applied on chroma samples on the border of chroma transform block for blocks with same reference QP as the current picture/block.

One technology for loop filtering, aiming at removing coding artifacts, used in HEVC is Sample Adaptive Offset (SAO). When it is specified that SAO is used for a block, in HEVC vocabulary coding tree unit (CTU), it either modifies pixel values in adjacent bands of pixel values or modify pixel values that has a certain edge characteristic in a specified direction (edge offset class). Band offsets are defined in 4 bands/categories, where the position of the band with smallest pixel values is specified and the other bands with increasing pixel values follows. Edge offsets are defined in 4 categories: maxima, minima, increasing step or decreasing step. The offsets are specific for each block but can also be copied from a neighboring block. SAO can be used independently for respective color component, e.g. luma and chroma components.

In another embodiment, the chroma QP can be reduced if a criterion based on the offset parameters of the SAO filter

| | | | | | | | | | | | | | | | | | | | |
|---|---|---|---|---|---|---|---|---|---|---|---|---|---|---|---|---|---|---|---|
| Frame 1: | B | 8 | 1 | −3 | 0.442 | 0 | 0 | 0 | 4 | 4 | −8 | −10 | −12 | −16 | 0 | | | | |
| Frame 2: | B | 4 | 2 | −4 | 0.3536 | 0 | 0 | 0 | 2 | 3 | −4 | −6 | 4 | 1 | 4 | 5 | 1 | 1 | 0 0 1 |
| Frame 3: | B | 2 | 3 | 5 | 0.3536 | 0 | 0 | 0 | 2 | 4 | −2 | −4 | 2 | 6 | 1 | 2 | 4 | 1 | 1 1 |
| Frame 4: | B | 1 | 4 | −6 | 0.68 | 0 | 0 | 1 | 2 | 4 | −1 | 1 | 3 | 7 | 1 | 1 | 5 | 1 | 0 1 1 1 |
| Frame 5: | B | 3 | 4 | −6 | 0.68 | 0 | 0 | 1 | 2 | 4 | −1 | −3 | 1 | 5 | 1 | −2 | 5 | 1 | 1 1 1 0 |
| Frame 6: | B | 6 | 3 | −5 | 0.3536 | 0 | 0 | 0 | 2 | 4 | −2 | −4 | −6 | 2 | 1 | −3 | 5 | 1 | 1 1 0 |
| Frame 7: | B | 5 | 4 | −6 | 0.68 | 0 | 0 | 1 | 2 | 4 | −1 | −5 | 1 | 3 | 1 | 1 | 5 | 1 | 0 1 1 1 |
| Frame 8: | B | 7 | 4 | −6 | 0.68 | 0 | 0 | 1 | 2 | 4 | −1 | −3 | −7 | 1 | 1 | −2 | 5 | 1 | 1 1 1 0 | is fulfilled. As an example this can be done for blocks with same reference QP as the current picture/block.

According to a further embodiment, the chroma QP is adjusted by setting the chroma QP offset for a picture or slice based on the distribution of chroma samples.

Thus, according to an aspect, the chroma QP is reduced if a criterion regarding the distribution of chroma samples of the source is fulfilled.

In this case, the first step in FIG. 7 comprises reducing the QP for at least one transform coefficient of one chroma component compared to a reference QP when a criterion, e.g. based on the chroma sample distribution, is fulfilled.

If many chroma samples have the same value the quantization can have a relatively large effect on the quantization noise compared to when chroma samples are more equally distributed with no specific peak values. Having a lower chroma QP for peaky chroma sample distributions can improve the chroma representation significantly since it is more likely that the peaks are represented well. One approach is to estimate the chrominance distribution of a picture or slice before coding the picture or slice and based on that determine a picture or slice chroma QP to be used when encoding the picture or slice. Another approach is to test to quantize and inverse quantize the samples of a color component before coding and select the chroma component QP that gives most effect on reducing the distortion from quantization. A lower chroma component QP will typically reduce the distortion from quantization but will also increase the bitrate for coding of the chroma component. If there is a peaky chroma sample distribution a certain chroma component QP can have most effect on reducing the quantization distortion. Reducing the chroma QP further can reduce the quantization distortion further but not enough compared to the expected increase in bitrate. To trade off both the quantization distortion and the estimated number of bits RDO (rate distortion optimization) can be used with a cost function based on a lambdeestBits+dist. Where estBits can be a function of the chroma component QP and dist can be the sum of squared distortions (or absolute value of distortion) for the picture. Lambda can be a function of QP. To reflect that chroma quantization distortion in dark areas is less visible than chroma distortion in light areas a weighting of the distortion based on the luma can be used. Each chroma distortion sample can be multiplied by a weighted average of corresponding luma samples. Thus will the chroma distortion be biased to chroma distortion in light areas and take less notice to distortion in dark areas. It can be noted that the approach also can be used for setting the luma QP.

According to a further embodiment, the chroma QP is adjusted by setting the chroma QP offset for a picture or slice based on distortion from quantization and inverse quantization of chroma samples.

In another embodiment the chroma QP can be reduced if a criterion based on the size of at least one transform is fulfilled. The chroma QP is set to a smaller value than the luma QP for larger transform sizes compared to smaller transform sizes.

In an embodiment, the chroma QP is set according to a characteristic of the source luma and chroma samples. In other words, the chroma QP can be reduced according to a criterion related to a characteristic of the source luma and chroma samples. In one version of this embodiment, the chroma QP is set according to the amount of motion in the source luma/chroma sequence. In another version of this embodiment, the chroma QP offset is set based on the colors of the source sequence. For instance, blocks containing bright pixels, i.e. luma samples are high, could be assigned a relatively lower chroma QP compared to luma QP than blocks containing darker pixels, i.e. luma samples are low, where the color artifact is typically less noticeable.

In another embodiment, the chroma QP is reduced compared to a reference QP if a criterion is fulfilled relating to the distribution of chroma samples of the source and the value of the reference QP.

A scaling matrix, with individual scaling factors for respective transform coefficient, can be used to make a different quantization effect for respective transform coefficient by scaling the transform coefficients individually with respective scaling factor as part of the quantization. This enables for example that the quantization effect is stronger for higher frequency transform coefficients than for lower frequency transform coefficients. In HEVC default scaling matrices are defined for each transform size and can be invoked by flags in the Sequence Parameter Set (SPS) and/or the Picture Parameter Set (PPS). Scaling matrices also exist in H.264. In HEVC it is also possibly to define own scaling matrices in SPS or PPS specifically for respective color component, transform size and prediction type (intra or inter mode). In equation 5, below from HEVC specification [1] it is shown how the scaling factors (m[x][y]) can be used to scales the quantized transform coefficients (TransCoeffLevel). When the scaling factor is larger than 16 a coefficient will be quantized more than when the scaling factor is less than 16. A scaling factor equal to 16 corresponds to quantization without scaling.

For the derivation of the scaled transform coefficients d[x][y] with x=0 . . . nTbS−1, y=0 . . . nTbS−1, the following applies:

The scaling factor m[x][y] is derived as follows:
If one or more of the following conditions are true, m[x][y] is set equal to 16:
scaling_list_enabled_flag is equal to 0.
transform_skip_flag[xTbY][yTbY] is equal to 1 and nTbS is greater than 4.
Otherwise, the following applies:
m[x][y]=ScalingFactor[sizeId][matrixId][x][y]
Where sizeId is specified in Table 7-3 in [1] for the size of the quantization matrix equal to (nTbS)×(nTbS) and matrixId is specified in Table 7-4 in [1] for sizeId, CuPredMode[xTbY][yTbY], and cIdx, respectively.

The scaled transform coefficient d[x][y] is derived as follows:

$$d[x][y]=\text{Clip3}(\text{coeffMin},\text{coeffMax},((\text{TransCoeffLevel}[xTbY][yTbY][cIdx][x][y]*m[x][y]*\text{levelScale}[qP\%6]<<(qP/6))+(1<<(bd\text{Shift}-1)))>>bd\text{Shift}) \quad \text{equation 5}$$

According to further aspects, at least one scaling matrix for a slice or picture is set according to the hierarchical level, where the hierarchical level is defined by the QP used for luma for that picture compared to the QP used for an independently decodable picture (IRAP). A larger difference between the luma QP of the current picture compared to the luma QP for the IRAP correspond to a higher hierarchical level. One example is to increase the fidelity, e.g. in HEVC scaling factor less than 16, of the lower frequency coefficients compared to the higher frequency coefficients, e.g. in HEVC scaling factor equal to 16, with increasing hierarchical level. Another example is to decrease the fidelity of higher frequency coefficients, e.g. in HEVC scaling factor larger than 16, compared to low frequency coefficients, e.g. in HEVC scaling factor equal to 16. This can then when used in combination with increased QP, increased hierarchical level, make the effect of QP act differently for low frequency coefficients than high frequency coefficients.

The QP for chroma (Cb or Cr) is used to quantize (in the encoder) and inverse quantize (in the encoder and the decoder) the chroma transform coefficients. Part of the inverse quantization that is described in HEVC is a fixed scaling factor of 16. This is used when no scaling is enabled. If scaling is enabled the scaling matrix for chroma enables an individual modification of the QP for respective transform coefficient, e.g. frequency. A scaling factor above 16 correspond to increasing the QP for the corresponding transform coefficient, a scaling factor below 16 correspond to decreasing the QP for the corresponding transform coefficient. So the chroma QP can be reduced for low frequency coefficients that typically are visually more important to improve the chroma quality. So according to an embodiment, when the reference QP is increased we reduce the chroma QP, which is derived from the reference QP, by applying a scaling factor which is less than 16 for low frequency transform coefficients so that the increase of the reference QP not give same increase of the chroma QP as for luma QP. This can improve the chroma quality without so large effect of the total bitrate.

In another embodiment, at least one chroma scaling matrix for a slice or a picture is set according to a criterion regarding the hierarchical level, where the hierarchical level is defined by the QP used for luma for that picture compared to the QP used for an independently decodable picture (IRAP). The reference QP may be the luma QP. A larger difference between the luma QP of the current picture compared to the luma QP for the IRAP correspond to a higher hierarchical level. One example is to increase the fidelity, e.g. in HEVC scaling factor less than 16, of the lower frequency chroma coefficients compared to the higher frequency chroma coefficients, e.g. in HEVC scaling factor equal to 16, with increasing hierarchical level. Another example is to decrease the fidelity of higher frequency chroma coefficients, e.g. in HEVC scaling factor larger than 16, compared to low frequency chroma coefficients, e.g. in HEVC scaling factor equal to 16. This can then when used in combination with increased chroma QP give low frequency chroma coefficients better fidelity than the high frequency chroma coefficients.

Another aspect of the embodiments relates to a device for calculating a QP value for a chroma component of a pixel in a picture comprising a plurality of pixels in a video sequence comprising a plurality of pictures. The device is configured to calculate a QP offset value for the chroma component based on a reference QP value and a factor that depends on a difference between a capture color space for the pixel and an encoded color space for the pixel. The device is also configured to calculate the QP value for the chroma component based on the reference QP value reduced by the QP offset value.

In an embodiment, the device is configured to convert a linear RGB value of the pixel in the capture color space into a luma component value and two subsampled chroma component values in the encoded color space, wherein the chroma component is a chroma component for one of the two subsampled chroma component values.

In an embodiment, the device is configured to calculate the QP offset value for the chroma component based on a QP value of a luma component for the pixel and the factor that depends on the difference between the capture color space for the pixel and the encoded color space for the pixel. The device is also configured to calculate the QP value for the chroma component based on the QP value of the luma component reduced by the QP offset value.

In an embodiment, the device is configured to calculate the QP offset value based on the reference QP value and the factor representing a ratio between a maximum magnitude for the chroma component in the encoded color space and a maximum magnitude for the chroma component when it was originally captured in the capture color space.

In an embodiment, the device is configured to calculate the QP offset value based on the reference QP value and the factor representing a ratio between a range for the chroma component in the encoded color space and a range for the chroma component value in the capture color space.

In an embodiment, the device is configured to calculate the QP offset value based on max(−12, round(f×(k×refQP+m))). In another embodiment, the device is configured to calculate the QP offset value based on min(0, round(f×(k× refQP+m))). In a further embodiment, the device is configured to calculate the QP offset value based on Clip3(−12, 12, min(0, round(f×(k×refQP+m)))).

A further aspect of the embodiments relates to a device for calculating a QP value for a chroma component Cb and/or Cr of a pixel in a picture comprising a plurality of pixels in a video sequence comprising a plurality of pictures. The device is configured to calculate a QP offset value for the chroma component Cb and/or Cr based on max(−12, round (c_cb×(k×refQP+m))) and/or max(−12, round(c_cr×(k× refQP+m))). k is a chroma scaling factor, m is a chroma offset, refQP is a reference QP value and c_cb=1 and c_cr=1 if a capture color space for the pixel is same as an encoded color space for the pixel, c_cb=1.04 and c_cr=1.39 if the capture color space is P3D65 and the encoded color space is ITU-R 2020, c_cb=1.14 and c_cr=1.78 or 1.79 if the capture color space is ITU-R 709 and the encoded color space is ITU-R 2020, max(a, b) is equal to a if a>b and otherwise equal to b, round(a) rounds a to the nearest integer. The device is also configured to calculate the QP value for the chroma component Cb and/or Cr based the reference QP value reduced by the QP offset value.

In an embodiment, the device according to any of the aspects is configured to encode the QP offset value. The device is also configured to send the encoded QP offset value to a decoder.

Another aspect of the embodiments relates to an encoder for encoding a video sequence comprising a plurality of pictures. Each picture comprises a plurality of pixels and each pixel is associated with a luma component value and two subsampled chroma component values. The encoder is configured to calculate, for a pixel in a picture of the video sequence, a residual based on a difference between a subsampled chroma component value and a predicted chroma component value. The encoder is also configured to transform the residual into a frequency domain to obtain transform coefficients. The encoder also comprises a device for calculating a QP value according to above. The device is configured to calculate a QP value for the chroma component. The encoder further is configured to quantize the transform coefficients, wherein a level of quantization is determined by the QP value.

In an embodiment, the encoder is configured to encode the quantized transform coefficients and optionally the QP offset value.

A further aspect of the embodiments relates to a decoder for decoding an encoded video sequence comprising a plurality of pictures. Each picture comprises a plurality of pixels and each pixel is associated with a luma component value and two subsampled chroma component values. The decoder is configured to decode the encoded video sequence to obtain quantized transform coefficients and a QP offset value for a chroma component of a pixel. The QP offset value depends on a reference QP value and a factor that depends on a difference between a capture color space for the pixel and an encoded color space for the pixel. The decoder is also configured to dequantize the quantized transform coefficients using a QP value determined based on the reference QP value reduced by the QP offset value to obtain transform coefficients. The decoder is further configured to inverse transform the transform coefficients to obtain a residual. The decoder is additionally configured to calculate a reconstructed subsampled chroma component value based on the residual and a predicted chroma component value.

An encoder is also provided. The encoder is configured to reduce the QP for at least one transform coefficient of one chroma component compared to a reference QP, e.g. $Qp_Y$+pps_cb_qp_offset and $Qp_Y$+pps_cr_qp_offset, when a criterion, based at least on the reference QP and a factor that depends on the difference between the capture color space and the encoded color space is fulfilled. The encoder is also configured to encode a difference between the reduced QP and the reference QP. The encoder is further configured to send the encoded difference to a decoder.

The embodiments are generic and can be applied to any encoder for encoding a video sequence. It could also be basis for optimization of a new coding tool or adaptation of an existing coding tool to better enable this.

Figure 16:
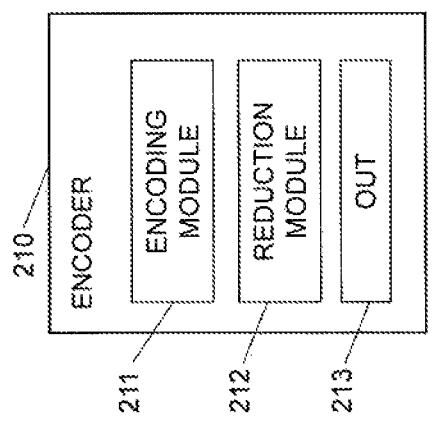
FIG. 16 is a schematic block diagram of an encoder according to another embodiment.

FIG. 16 illustrates a particular implementation of an encoder 210 according to the embodiments. In the embodiment, the encoder 210 comprises a reduction module 211 for reducing the QP for at least one transform coefficient of one chroma component compared to a reference QP, e.g. $Qp_Y$+pps_cb_qp_offset and $Qp_Y$+pps_cr_qp_offset, when a criterion, based at least on the reference QP and a factor that depends on the difference between the capture color space and the encoded color space, is fulfilled. The encoder 210 of this embodiment also comprises an encoding module 212 for encoding a difference between the reduced QP and the reference QP. The encoder 210 further comprises an output unit 213 for sending the encoded difference to a decoder.

The output unit 213 could be in the form of a general output unit, in particular in the case of a wired connection to external devices. Alternatively, the output unit 213 could be in the form of a receiver or transceiver, in particular in the case or a wireless connection to external devices.

The device, encoder and/or decoder of the embodiments may be implemented as hardware circuitry. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12:
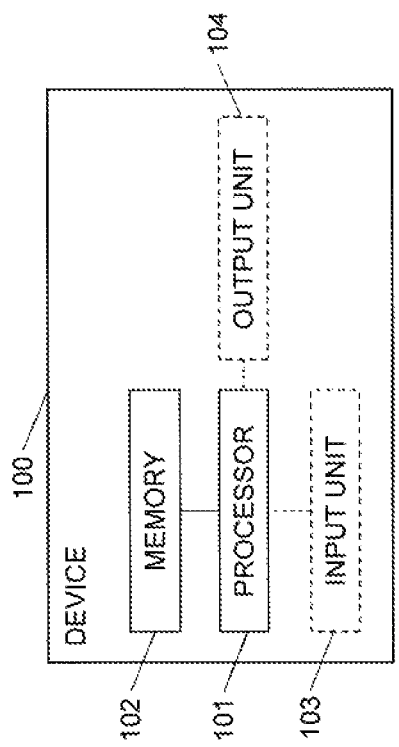
FIG. 12 is a schematic block diagram of a device calculating a QP value according to an embodiment.

FIG. 12 is a schematic block diagram illustrating a device 100 for calculating a QP value for a chroma component and comprising a processor 101 and a memory 102. The memory 102 comprises instructions executable by the processor 101. The processor 101 is operative to calculate the QP offset value for the chroma component based on the reference QP value and the factor that depends on the difference between the capture color space for the pixel and the encoded color space for the pixel. The processor 101 is also operative to calculate the QP value for the chroma component based on the reference QP value reduced by the QP offset value.

In another embodiment, the processor 101 is operative to calculate the QP offset value for the chroma component Cb and/or Cr based on max(−12, round(c_cb×(k×refQP+m))) and/or max(−12, round(c_cr×(k×refQP+m))). The processor 101 is also operative to calculate the QP value for the chroma component Cb and/or Cr based the reference QP value reduced by the QP offset value.

In a further embodiment, the processor 101 is operative to calculate the QP offset value for the chroma component Cb and/or Cr based on min(0, round(c_cb×(k×refQP+m))) and/or min(0, round(c_cr×(k×refQP+m))). The processor 101 is also operative to calculate the QP value for the chroma component Cb and/or Cr based the reference QP value reduced by the QP offset value.

In yet another embodiment, the processor 101 is operative to calculate the QP offset value for the chroma component Cb and/or Cr based on Clip3(−12, 12, min(0, round(c_cb×(k×refQP+m)))) and/or Clip3(−12, 12, min(0, round(c_cr×(k×refQP+m)))). The processor 101 is also operative to calculate the QP value for the chroma component Cb and/or Cr based the reference QP value reduced by the QP offset value.

The device 100 optionally comprises an input unit 103 and an output unit 104. In such an embodiment, the input unit 103 is configured to receive the pictures of the video sequence and forwards the pictures to the processor 101 or to the memory 102. In such a case, the processor 101 may retrieve information of the capture and encoded color spaces from the video sequence. In an alternative approach, the input unit 103 merely receives information of the capture and encoded color spaces and the respective reference QP values for the pixels. Thus, in such an approach not the complete video sequence but merely information retrieved therefrom is input to the input unit 103.

Correspondingly, the output unit 104 is configured to output the video sequence with the calculated QP values for the chroma components. In another approach, the output unit 104 merely outputs the calculated QP values for the chroma components and not necessarily the video sequence.

The input unit 103 and the output unit 104 could be implemented as a respective input and output port. Alternatively, the input unit 103 could be implemented as a receiver and the output unit 104 as a transmitter. A further alternative is to have a transceiver performing the functionalities of the input unit 103 and the output unit 104.

Figure 13:
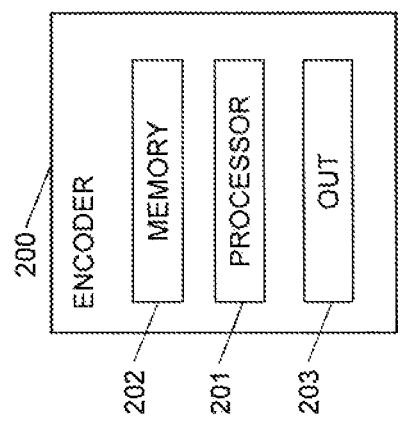
FIG. 13 is a schematic block diagram of an encoder according to an embodiment.

FIG. 13 is a corresponding schematic block diagram of an encoder 200 comprising a processor 201 and a memory 202. The memory 202 comprises instructions executable by the processor 201. The processor 201 is operative to calculate, for the pixel in the picture of the video sequence, the residual based on the difference between the subsampled chroma component value and the predicted chroma component value. The processor 201 is also operative to transform the residual into the frequency domain to obtain the transform coefficients. The processor 201 is further operative to calculate the QP value for the chroma component based on the reference QP value reduced by the QP offset value calculated for the chroma component based on the reference QP value and the factor that depends on the difference between the capture color space for the pixel and the encoded color space for the pixel. The processor 201 is additionally operative to quantize the transform coefficients, wherein the level of quantization is determined by the QP value.

The encoder 200 optionally comprises an output unit 203 configured to output the encoded video sequence in the form of a bitstream comprising encoded quantized transform coefficients. The bitstream preferably also comprises encoded QP offset values for the chroma components.

In a particular example, the encoder 200 as exemplified in FIG. 13 comprises a processor 201 and a memory 202 comprising instructions executable by the processor. The processor 201 is operative to reduce the QP for at least one transform coefficient of one chroma component compared to a reference QP, e.g. $Qp_Y$+pps_cb_qp_offset and $Qp_Y$+pps_cr_qp_offset, when a criterion, based at least on the reference QP and a factor that depends on the difference between the capture color space and the encoded color space, is fulfilled. The processor 201 is also operative to encode a difference between the reduced QP and the reference QP, and send the encoded difference to a decoder.

Figure 14:
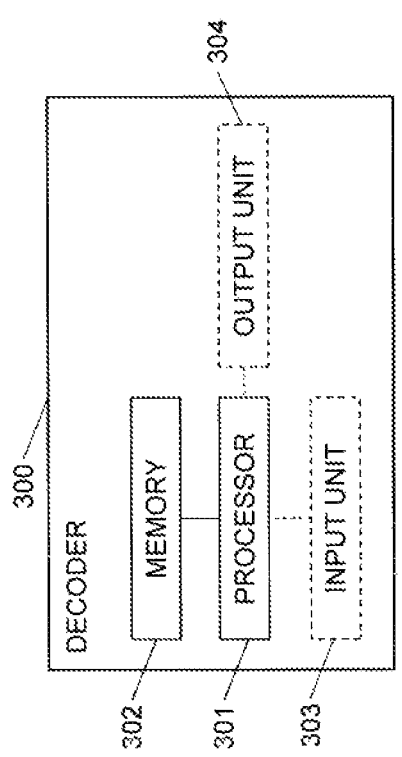
FIG. 14 is a schematic block diagram of a decoder according to an embodiment.

FIG. 14 is a schematic block diagram of a decoder 300 for decoding an encoded video sequence. The decoder 300 comprises a processor 301 and a memory 302. The memory 302 comprises instructions executable by the processor 301. The processor 301 is operative to decode the encoded video sequence to obtain the quantized transform coefficients and the QP offset value for the chroma component of the pixel. The QP offset value depends on the reference QP value and the factor that depends on the difference between the capture color space for the pixel and the encoded color space for the pixel. The processor 301 is also operative to dequantize the quantized transform coefficients using the QP value calculated based on the reference QP value reduced by the QP offset value to obtain the transform coefficients. The processor 301 is further operative to inverse transform the transform coefficients to obtain the residual. The processor 301 is additionaly operative to calculate the reconstructed subsampled chroma component value based on the residual and the predicted chroma component value.

The decoder 300 optionally comprises an input unit 303 configured to receive the encoded video sequence. The decoder 300 optionally comprises an output unit 304 configured to output the decoded video sequence, i.e. the decoded pictures of the video sequence.

The optional input unit 303 and output unit 304 could be implemented as input and output ports, receiver and transmitter, or a transceiver as described in connection with FIG. 12.

In a particular embodiment, the processor 101, 201, 301 as shown in FIGS. 12-14 is operative, when executing the instructions stored in the memory 102, 202, 302 to perform the above described operations. The processor 101, 201, 301 is thereby interconnected to the memory 102, 202, 302 to enable normal software execution.

The term 'processor' should be interpreted in a general sense as any system or device capable of executing program code or computer program instructions to perform a particular processing, determining or computing task.

The processing circuitry including one or more processors is, thus, configured to perform, when executing the computer program, well-defined processing tasks such as those described herein.

The processing circuitry does not have to be dedicated to only execute the above-described steps, functions, procedure and/or blocks, but may also execute other tasks.

The flow diagrams presented herein may be regarded as a computer flow diagrams, when performed by one or more processors. A corresponding device may be defined as a group of function modules, where each step performed by the processor corresponds to a function module. In this case, the function modules are implemented as a computer program running on the processor. Hence, the device, encoder and decoder may alternatively be defined as a group of function modules, where the function modules are implemented as a computer program running on at least one processor.

Figure 17:
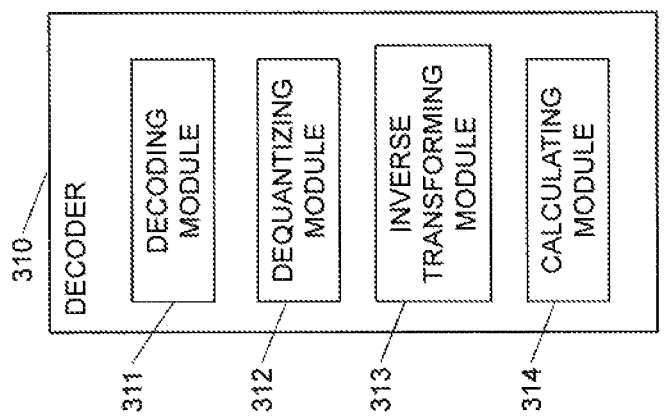
FIG. 17 is a schematic block diagram of a decoder according to another embodiment.

The computer program residing in memory may thus be organized as appropriate function modules configured to perform, when executed by the processor, at least part of the steps and/or tasks described herein. Examples of such function modules are illustrated in FIGS. 15-17.

Figure 15:
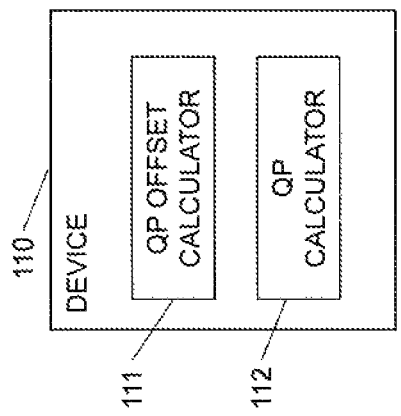
FIG. 15 is a schematic block diagram of a device calculating a QP value according to another embodiment.

FIG. 15 is a schematic block diagram of a device 100 for calculating a QP value for a chroma component of a pixel in a picture comprising a plurality of pixels in a video sequence comprising a plurality of pictures.

In an embodiment, the device 110 comprises a QP offset calculator 111 for calculating a QP offset value for the chroma component based on a reference QP value and a factor that depends on a difference between a capture color space for the pixel and an encoded color space for the pixel. The device 110 also comprises a QP calculator 112 for calculating the QP value for the chroma component based on the reference QP value reduced by the QP offset value.

In another embodiment, the device 110 comprises a QP offset calculator 111 for calculating a QP offset value for the chroma component Cb and/or Cr based on max(−12, round (c_cb×(k×refQP+m))) and/or max(−12, round(c_cr×(k× refQP+m))). The device 110 also comprises a QP calculator 112 for calculating the QP value for the chroma component Cb and/or Cr based on the reference QP value reduced by the QP offset value.

In a further embodiment, the device 110 comprises a QP offset calculator 111 for calculating a QP offset value for the chroma component Cb and/or Cr based on min(0, round (c_cb×(k×refQP+m))) and/or min(0, round(c_cr×(k×refQP+ m))). The device 110 also comprises a QP calculator 112 for calculating the QP value for the chroma component Cb and/or Cr based on the reference QP value reduced by the QP offset value.

In yet another embodiment, the device 110 comprises a QP offset calculator 111 for calculating a QP offset value for the chroma component Cb and/or Cr based on Clip3(−12, 12 min(0, round(c_cb×(k×refQP+m)))) and/or Clip3(−12, 12 min(0, round(c_cr×(k×refQP+m)))). The device 110 also comprises a QP calculator 112 for calculating the QP value for the chroma component Cb and/or Cr based on the reference QP value reduced by the QP offset value.

FIG. 16 is a schematic block diagram of an encoder 210 for encoding a video sequence comprising a plurality of pictures. Each picture comprises a plurality of pixels and each pixel is associated with a luma component value and two subsampled chroma component values. The encoder 210 comprises an encoding module 211 for calculating, for a pixel in a picture of the video sequence, a residual based on a difference between a subsampled chroma component value and a predicted chroma component value. The encoding module 211 is also for transforming the residual into a frequency domain to obtain transform coefficients and quantizing the transform coefficients, wherein a level of quantization is determined by a QP value. The encoder 210 also comprises a reduction module 212 for calculating the QP value for the chroma component based on a reference QP value reduced by a QP offset value calculated for the chroma component based on the reference QP value and a factor that depends on a difference between a capture color space for the pixel and an encoded color space for the pixel.

FIG. 17 is a schematic block diagram of a decoder 310 for decoding an encoded video sequence comprising a plurality of pictures. Each picture comprises a plurality of pixels and each pixel is associated with a luma component value and two subsampled chroma component values. The decoder 310 comprises a decoding module 311 for decoding the encoded video sequence to obtain quantized transform coefficients and a QP offset value for a chroma component of a pixel. The QP offset value depends on a reference QP value and a factor that depends on a difference between a capture color space for the pixel and an encoded color space for the pixel. The decoder 310 also comprises a dequantizing module 312 for dequantizing the quantized transform coefficients using a QP value determined based on the reference QP value reduced by the QP offset value to obtain transform coefficients. The decoder 310 further comprises an inverse transforming module 313 for inverse transforming the transform coefficients to obtain a residual. The decoder 310 additionally comprises a calculating module 314 for calculating a reconstructed subsampled chroma component value based on the residual and a predicted chroma component value.

Figure 18:
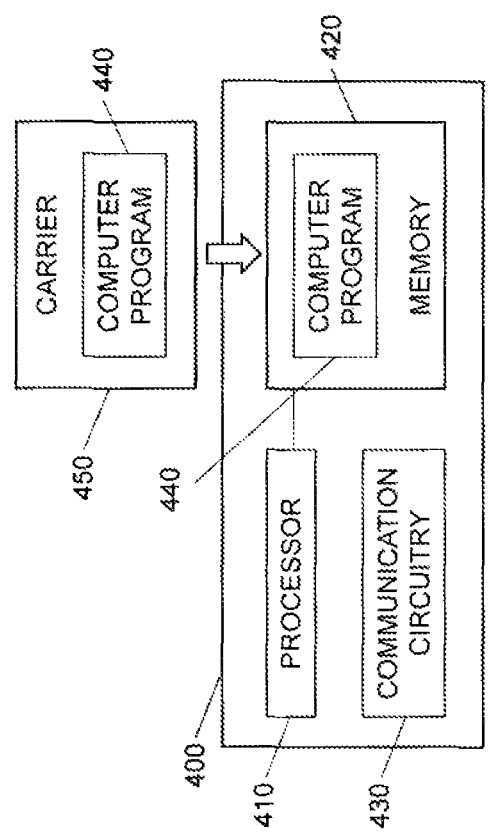
FIG. 18 is a schematic illustration of a user equipment according to an embodiment.

The proposed technology also provides a carrier 450 comprising a computer program 440, see FIG. 18. The carrier 450 is one of an electronic signal, an optical signal, an electromagnetic signal, a magnetic signal, an electric signal, a radio signal, a microwave signal, or a computer-readable storage medium.

By way of example, the software or computer program 440 may be realized as a computer program product, which is normally carried or stored on a computer-readable medium, preferably non-volatile computer-readable storage medium 450. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 440 may thus be loaded into the operating memory of a computer or equivalent processing device, represented by a user equipment 400 in FIG. 18 for execution by the processor 410 thereof.

FIG. 18 is a schematic block diagram illustrating an example of a user equipment or device 400 comprising a processor 410, an associated memory 420 and a communication circuitry 430.

In this particular example, at least some of the steps, functions, procedures, modules and/or blocks described herein are implemented in a computer program 440, which is loaded into the memory 420 for execution by processing circuitry including one or more processors 410. The processor 410 and memory 420 are interconnected to each other to enable normal software execution. A communication circuitry 430 is also interconnected to the processor 410 and/or the memory 420 to enable input and/or output of video data.

The user equipment 400 can be any device or apparatus that can receive and process video data. For instance, the user equipment 400 could be a video camera, a computer, either stationary or portable, such as laptop, a smart phone, a tablet, a set-top box, a server or any other device that can process a video sequence. The video camera can also be implemented in a computer, either stationary or portable, such as laptop, a smart phone, a tablet, a set-top box, etc.

In an embodiment, the computer program 440 comprises instructions, which when executed by the processor 410, cause the processor 410 to calculate a QP offset value, for a chroma component of a pixel in a picture comprising a plurality of pixels in a video sequence comprising a plurality of pictures, based on a reference QP value and a factor that depends on a difference between a capture color space for the pixel and an encoded color space for the pixel. The processor 410 is also caused to calculate a QP value for the chroma component based on the reference QP value reduced by the QP offset value.

In another embodiment, the computer program 440 comprises instructions, which when executed by a processor 410, cause the processor 410 to calculate a QP offset value, for a chroma component Cb and/or Cr of a pixel in a picture comprising a plurality of pixels in a video sequence comprising a plurality of pictures, based on max(−12, round (c_cb×(k×refQP+m))) and/or max(−12, round(c_cr×(k× refQP+m))). The processor 410 is also caused to calculate a QP value for the chroma component Cb and/or Cr based the reference QP value reduced by the QP offset value.

In a further embodiment, the computer program 440 comprises instructions, which when executed by a processor 410, cause the processor 410 to calculate a QP offset value, for a chroma component Cb and/or Cr of a pixel in a picture comprising a plurality of pixels in a video sequence comprising a plurality of pictures, based on min(0, round(c_cb× (k×refQP+m))) and/or min(0, round(c_cr×(k×refQP+m))). The processor 410 is also caused to calculate a QP value for the chroma component Cb and/or based the reference QP value reduced by the QP offset value.

In yet another embodiment, the computer program 440 comprises instructions, which when executed by a processor 410, cause the processor 410 to calculate a QP offset value, for a chroma component Cb and/or Cr of a pixel in a picture comprising a plurality of pixels in a video sequence comprising a plurality of pictures, based on Clip3(−12, 12, min(0, round(c_cb×(k×refQP+m)))) and/or Clip3(−12, 12, min(0, round(c_cr×(k×refQP+m)))). The processor 410 is also caused to calculate a QP value for the chroma component Cb and/or based the reference QP value reduced by the QP offset value.

In an additional embodiment, the computer program 440 comprises instructions, which when executed by a processor 410, cause the processor 410 to calculate, for a pixel of in a picture of a video sequence comprising a plurality of pictures, each picture comprises a plurality of pixels and each pixel is associated with a luma component value and two subsampled chroma component values, a residual based on a difference between a subsampled chroma component value and a predicted chroma component value. The processor 410 is also caused to transform the residual into a frequency domain to obtain transform coefficients. The processor 410 is further caused to quantize the transform coefficients, wherein a level of quantization is determined by a quantization parameter, QP, value. The processor 410 is additionally caused to calculate the QP value for said chroma component based on a reference QP value reduced by a QP offset value calculated for the chroma component based on the reference QP value and a factor that depends on a difference between a capture color space for the pixel and an encoded color space for the pixel.

In yet another embodiment, the computer program 440 comprises instructions, which when executed by a processor 410, cause the processor 410 to decode an encoded video sequence, comprising a plurality of pictures to obtain quantized transform coefficients and a QP offset value for a chroma component of a pixel, the QP offset value depends on a reference QP value and a factor that depends on a difference between a capture color space for the pixel and an encoded color space for the pixel. Each picture comprises a plurality of pixels and each pixel is associated with a luma component value and two subsampled chroma component values. The processor 410 is also caused to dequantize the quantized transform coefficients using a QP value determined based on the reference QP value reduced by the QP offset value to obtain transform coefficients. The processor 410 is further caused to inverse transform the transform coefficients to obtain a residual and calculate a reconstructed subsampled chroma component value based on the residual and a predicted chroma component value.

Another embodiment relates to a device for calculating a QP value for a chroma component of a pixel in a picture comprising a plurality of pixels in a video sequence comprising a plurality of pictures. The device is configured to calculate a QP offset value for the chroma component based on a hierarchical level for a picture in the video sequence. The device also configured to calculate the QP value for the chroma component based on a reference QP value and the QP offset value.

In an embodiment, the device is configured to calculate the QP offset value for the chroma component based on a luma QP value for the picture and on a luma QP value for an independently decodable picture, IRAP, in the video sequence.

In an embodiment, the device is configured to calculate the QP value for the chroma component based on the luma QP value for the picture reduced by the QP offset value.

In another embodiment, the device is configured to calculate the QP value for the chroma component based on the luma QP value for the picture increased by the QP offset value.

The device in these embodiments may be implemented as a processor and memory, with functional modules, in hardware or as a computer program as described the foregoing in connection with FIGS. 12-18.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 19:
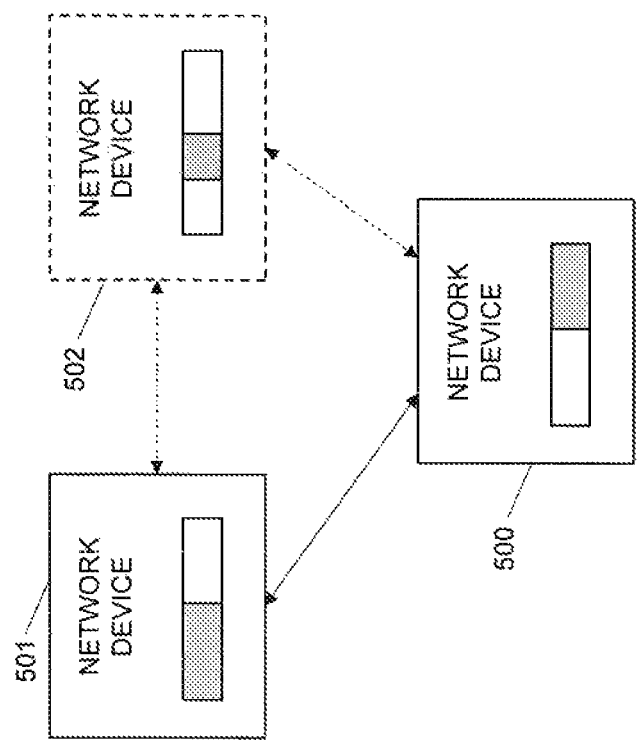
FIG. 19 schematically illustrate a distributed implementation of the embodiments among multiple network devices.

FIG. 19 is a schematic diagram illustrating an example of how functionality can be distributed or partitioned between different network devices 500, 501, 502 in a general case. In this example, there are at least two individual, but interconnected network devices 500, 501, which may have different functionalities, or parts of the same functionality, partitioned between the network devices 500, 501.

There may be additional network devices 502 being part of such a distributed implementation. The network devices 500, 501, 502 may be part of the same wireless communication system, or one or more of the network devices may be so-called cloud-based network devices located outside of the wireless communication system.

Figure 20:
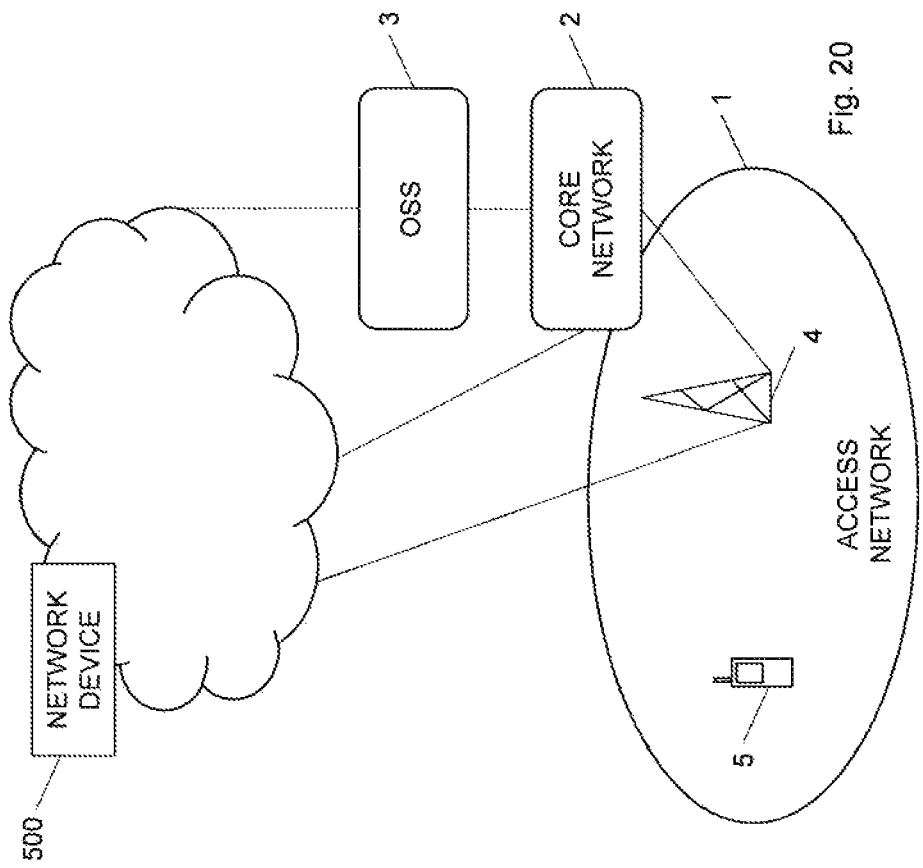
FIG. 20 is a schematic illustration of an example of a wireless communication system with one or more cloud-based network devices according to an embodiment.

FIG. 20 is a schematic diagram illustrating an example of a wireless communication system, including an access network 1 and/or a core network 2 and/or an Operations and Support System (OSS) 3 in cooperation with one or more cloud-based network devices 500. The figure also illustrates a network node 4 of the access network 1 and a user equipment 5 according to the embodiments.

The components of FIGS. 12-17 are depicted as single boxes located within a single larger box. In practice however, device 100, 110, encoder 200, 210, decoder 300, 310 may comprise multiple different physical components that make up a single illustrated component, e.g. output unit may comprise terminals for coupling wires for a wired connection and a radio transceiver for a wireless connection.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the attached figures. For example, memory may comprise computer readable means on which a computer program can be stored. The computer program may include instructions which cause processor and any operatively coupled entities and devices, such as the output unit, and the memory, to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processor, possibly in cooperation with memory. Processor and memory may, thus, be arranged to allow processor to fetch instructions from memory and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and encoder or decoder systems and any feature from a particular figure disclosed in connection with other features may be applicable to any other figure and or combined with different features.

The embodiments described above are to be understood as a few illustrative examples of certain embodiments of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] ITU-T H.265 (April 2015), Telecommunication Standardization Sector of ITU, SERIES H: AUDIOVISUAL AND MULTIMEDIA SYSTEMS, Infrastructure of audiovisual services—Coding of moving video, High efficiency video coding
[2] ST 2084:2014—SMPTE Standard—High Dynamic Range Electro-Optical Transfer Function of Mastering Reference Displays, Aug. 29, 2014, pages 1-14

The invention claimed is:

1. A method of calculating a quantization parameter (QP) value for a chroma component of a pixel in a picture comprising a plurality of pixels in a video sequence comprising a plurality of pictures, wherein the video sequence is encoded using an encoded color space and the video sequence was captured using a capture color space, said method comprising:
   calculating a QP offset value for said chroma component based on a reference QP value and a factor that depends on a relation between the capture color space for said pixel and the encoded color space for said pixel; and
   calculating said QP value for said chroma component based on said reference QP value reduced by said QP offset value.

2. The method according to claim 1, further comprising converting a linear red, green, blue, RGB, value of said pixel in said capture color space into a luma component value and two subsampled chroma component values in said encoded color space, wherein said chroma component is a chroma component for one of said two subsampled chroma component values.

3. The method according to claim 1, wherein a magnitude of said QP offset value is larger the smaller said capture color space is compared to said encoded color space.

4. The method according to claim 1, wherein
   calculating said QP offset value comprises calculating said QP offset value for said chroma component based on a QP value of a luma component for said pixel and said factor that depends on said relation between said capture color space for said pixel and said encoded color space for said pixel; and
   calculating said QP value comprises calculating said QP value for said chroma component based on said QP value of said luma component reduced by said QP offset value.

5. The method according to claim 1, wherein calculating said QP offset value comprises calculating said QP offset value based on said reference QP value and said factor representing a ratio between a maximum magnitude for said chroma component in said encoded color space and a maximum magnitude for said chroma component when it was originally captured in said capture color space.

6. The method according to claim 1, wherein calculating said QP offset value comprises calculating said QP offset value based on said reference QP value and said factor representing a ratio between a range for said chroma component in said encoded color space and a range for said chroma component value in said capture color space.

7. The method according to claim 1, wherein calculating said QP offset value comprises calculating said QP offset value based on max(−12, round(f×(k×refQP+m))), wherein f denotes said factor, k is a chroma scaling factor, m is a chroma offset, refQP denotes said reference QP value, max(a, b) is equal to a if a>b and otherwise equal to b, round(a) rounds a to the nearest integer.

8. The method according to claim 7, wherein said chroma component is a Cb chroma component and said factor f=1 if said capture color space is same as said encoded color space, said factor f=1.04 if said capture color space is P3D65 and said encoded color space is ITU-R 2020 and said factor f=1.14 if said capture color space is ITU-R 709 and said encoded color space is ITU-R 2020.

9. The method according to claim 7, wherein said chroma component is a Cr chroma component and said factor f=1 if said capture color space is same as said encoded color space, said factor f=1.39 if said capture color space is P3D65 and said encoded color space is ITU-R 2020 and said factor f=1.78 or 1.79 if said capture color space is ITU-R 709 and said encoded color space is ITU-R 2020.

10. The method according to claim 1, further comprising:
    encoding said QP offset value; and
    sending said encoded QP offset value to a decoder.

11. The method according to claim 1, wherein calculating said QP offset value comprises calculating f×F(refQP), wherein f denotes said factor and F(refQP) is a value that is determined based on the reference QP value.

12. The method according to claim 11, wherein F(refQP) is equal to (k×refQP+m), where k is a chroma scaling factor, m is a chroma offset, and refQP denotes said reference QP value.

13. A method of calculating a quantization parameter (QP) value for a chroma component Cb and/or Cr of a pixel in a picture comprising a plurality of pixels in a video sequence comprising a plurality of pictures, said method comprising:
    calculating a QP offset value for said chroma component Cb and/or Cr based on max(−12, round(c_cb×(k×refQP+m))) and/or max(−12, round(c_cb×(k×refQP+m))), wherein k is a chroma scaling factor, m is a chroma offset, refQP is a reference QP value and c_cb=1 and c_cr=1 if a capture color space for said pixel is same as an encoded color space for said pixel, c_cb=1.04 and c_cr=1.39 if said capture color space is P3D65 and said encoded color space is ITU-R 2020, c_cb=1.14 and c_cr=1.78 or 1.79 if said capture color space is ITU-R 709 and said encoded color space is ITU-R 2020, max(a, b) is equal to a if a>b and otherwise equal to b, round(a) rounds a to the nearest integer; and
    calculating said QP value for said chroma component Cb and/or Cr based said reference QP value reduced by said QP offset value.

14. A device for calculating a quantization parameter (QP) value for a chroma component of a pixel in a picture comprising a plurality of pixels in a video sequence comprising a plurality of pictures, wherein the video sequence is encoded using an encoded color space and the video sequence was captured using a capture color space, and wherein said device is configured to:
- calculate a QP offset value for said chroma component based on a reference QP value and a factor that depends on a relation between the capture color space for said pixel and the encoded color space for said pixel; and
- calculate said QP value for said chroma component based on said reference QP value reduced by said QP offset value.

15. The device according to claim 14, wherein said device is configured to convert a linear red, green, blue, RGB, value of said pixel in said capture color space into a luma component value and two subsampled chroma component values in said encoded color space, wherein said chroma component is a chroma component for one of said two subsampled chroma component values.

16. The device according to claim 14, wherein
- said device is configured to calculate said QP offset value for said chroma component based on a QP value of a luma component for said pixel and said factor that depends on said relation between said capture color space for said pixel and said encoded color space for said pixel; and
- said device is configured to calculate said QP value for said chroma component based on said QP value of said luma component reduced by said QP offset value.

17. The device according to claim 14, wherein said device is configured to calculate said QP offset value based on said reference QP value and said factor representing a ratio between a maximum magnitude for said chroma component in said encoded color space and a maximum magnitude for said chroma component when it was originally captured in said capture color space.

18. The device according to claim 14, wherein said device is configured to calculate said QP offset value based on said reference QP value and said factor representing a ratio between a range for said chroma component in said encoded color space and a range for said chroma component value in said capture color space.

19. The device according to claim 14, wherein said device is configured to calculate said QP offset value based on max(−12, round(f×(k×refQP+m))), wherein f denotes said factor, k is a chroma scaling factor, m is a chroma offset, refQP denotes said reference QP value, max(a, b) is equal to a if a>b and otherwise equal to b, round(a) rounds a to the nearest integer.

20. An encoder for encoding a video sequence comprising a plurality of pictures, wherein each picture comprises a plurality of pixels and each pixel is associated with a luma component value and two subsampled chroma component values, wherein
- said encoder is configured to calculate, for a pixel in a picture of said video sequence, a residual based on a difference between a subsampled chroma component value and a predicted chroma component value;
- said encoder is configured to transform said residual into a frequency domain to obtain transform coefficients;
- said encoder comprises a device for calculating a quantization parameter (QP) value according to claim 14, said device is configured to calculate a QP value for said chroma component; and
- said encoder is configured to quantize said transform coefficients, wherein a level of quantization is determined by said QP value.

21. The encoder according to claim 20, further comprising:
- a processor; and
- a memory comprising instructions executable by said processor, wherein
- said processor is operative to calculate said residual;
- said processor is operative to transform said residual;
- said processor is operative to calculate said QP value; and
- said processor is operative to quantize said transform coefficients.

22. A decoder for decoding an encoded video sequence comprising a plurality of pictures, wherein each picture comprises a plurality of pixels and each pixel is associated with a luma component value and two subsampled chroma component values, wherein the encoded video sequence was encoded using an encoded color space and the video sequence was captured using a capture color space, the decoding being configured to:
- decode said encoded video sequence to obtain quantized transform coefficients and a quantization parameter (QP) offset value for a chroma component of a pixel, said QP offset value depends on a reference QP value and a factor that depends on a relation between the capture color space for said pixel and the encoded color space for said pixel;
- dequantize said quantized transform coefficients using a QP value determined based on said reference QP value reduced by said QP offset value to obtain transform coefficients;
- inverse transform said transform coefficients to obtain a residual; and
- calculate a reconstructed subsampled chroma component value based on said residual and a predicted chroma component value.

23. The decoder according to claim 22, further comprising:
- a processor; and
- a memory comprising instructions executable by said processor, wherein
- said processor is operative to decode said encoded video sequence;
- said processor is operative to dequantize said quantized transform coefficients;
- said processor is operative to inverse transform said transform coefficients; and
- said processor is operative to calculate said reconstructed subsampled chroma component value.

24. A user equipment comprising a device according to claim 14, an encoder according to claim 20 or a decoder according to claim 22, wherein said user equipment is selected from a group consisting of a video camera, a computer, a laptop, a smart phone, a tablet and a set-top box.

25. A computer program product comprising a non-transitory computer readable medium storing a computer program comprising instructions, which when executed by a processor, cause said processor to perform the method of claim 1.

* * * * *